US012781853B2

(12) United States Patent
Peer et al.

(10) Patent No.: US 12,781,853 B2
(45) Date of Patent: Nov. 3, 2026

(54) SYSTEMS, ASSEMBLIES, APPARATUSES, AND METHODS PROVIDING ENHANCED SEAL BETWEEN MACHINE COMPONENTS

(71) Applicant: Vulcan Industrial Holdings, LLC, Houston, TX (US)

(72) Inventors: Richard David Peer, Houston, TX (US); Steven Zachary Newberg, Houston, TX (US); Neerav Verma, Houston, TX (US); Benjamin Scott Berryhill, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 19/385,240

(22) Filed: Nov. 11, 2025

(65) Prior Publication Data

US 2026/0132850 A1 May 14, 2026

Related U.S. Application Data

(60) Provisional application No. 63/852,220, filed on Jul. 28, 2025, provisional application No. 63/720,038, filed on Nov. 13, 2024.

(51) Int. Cl.
*F16J 15/00* (2006.01)
*F04B 53/02* (2006.01)
(Continued)

(52) U.S. Cl.
CPC ............. *F16J 15/002* (2013.01); *F04B 53/02* (2013.01); *F04B 53/164* (2013.01);
(Continued)

(58) Field of Classification Search
CPC ....... F04B 53/02; F04B 53/164; F16J 15/002; F16J 15/162; F16J 15/18; F16J 15/183;
(Continued)

(56) References Cited

U.S. PATENT DOCUMENTS 1,316,539 A 9/1919 Ford
1,364,848 A 1/1921 Walsh
(Continued)

FOREIGN PATENT DOCUMENTS

CN 2550492 Y 5/2003
CN 2556355 Y 6/2003
(Continued)

OTHER PUBLICATIONS

Declaration of Duncan Hall from Internet Archive/Wayback Machine, Feb. 3, 2021, Kerr Plunger Pump Manuals, 20 pages.
(Continued)

*Primary Examiner* — Nicholas L Foster
(74) *Attorney, Agent, or Firm* — Womble Bond Dickinson (US) LLP

(57) ABSTRACT

Systems, assemblies, apparatuses, and methods herein may provide an enhanced fluid seal between two machine components. A seal may include a seal body having a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the second portion of the seal and one of the machine components, so as to reduce heat generation and extend a service life of the seal as the machine component moves relative to another machine component during operation of the machine.

26 Claims, 12 Drawing Sheets

(51) Int. Cl.
*F04B 53/16* (2006.01)
*F16J 15/18* (2006.01)
*F16J 15/20* (2006.01)
*F16J 15/3284* (2016.01)

(52) U.S. Cl.
CPC ............ *F16J 15/3284* (2013.01); *F16J 15/18* (2013.01); *F16J 15/183* (2013.01); *F16J 15/20* (2013.01)

(58) Field of Classification Search
CPC ........ F16J 15/20; F16J 15/324; F16J 15/3284; F16J 15/56
See application file for complete search history.

(56) References Cited

U.S. PATENT DOCUMENTS

| | | | |
|---|---|---|---|
| 1,576,269 A | | 3/1926 | Durant |
| 1,595,459 A | | 8/1926 | Durant |
| 1,671,139 A | | 5/1928 | Wilson |
| 1,836,068 A | | 12/1931 | Goldsberry |
| 1,873,318 A | | 8/1932 | Eason |
| 1,914,737 A | | 6/1933 | Elms |
| 1,947,198 A | | 2/1934 | Goble |
| 1,948,628 A | | 2/1934 | Penick |
| 1,963,684 A | | 6/1934 | Shimer |
| 1,963,685 A | | 6/1934 | Shimer |
| 2,004,259 A | | 6/1935 | Weiger |
| 2,011,547 A | | 8/1935 | Campbell |
| 2,069,443 A | | 2/1937 | Hill |
| 2,103,504 A | | 12/1937 | White |
| 2,143,399 A | | 1/1939 | Abercrombie |
| 2,146,709 A | | 2/1939 | Bird |
| 2,151,442 A | | 3/1939 | Hardy |
| 2,163,472 A | | 6/1939 | Shimer |
| 2,252,488 A | | 8/1941 | Bierend |
| 2,304,991 A | | 12/1942 | Foster |
| 2,506,128 A | | 5/1950 | Ashton |
| 2,539,996 A | | 1/1951 | Gleitz |
| 2,547,831 A | | 4/1951 | Mueller |
| 2,713,522 A | | 7/1955 | Lorenz |
| 2,719,737 A | | 10/1955 | Fletcher |
| 2,745,631 A | | 5/1956 | Shellman |
| 2,756,960 A | | 7/1956 | Church |
| 2,898,082 A | | 8/1959 | Von Almen |
| 2,969,951 A | | 1/1961 | Walton |
| 2,977,874 A | | 4/1961 | Ritzerfeld et al. |
| 2,982,515 A | | 5/1961 | Clinton |
| 2,983,281 A | | 5/1961 | Bynum |
| 3,048,412 A | | 8/1962 | Baker |
| 3,049,082 A | | 8/1962 | Barry |
| 3,053,500 A | | 9/1962 | Atkinson |
| 3,063,467 A | | 11/1962 | Roberts, Jr. |
| 3,120,960 A | | 2/1964 | Pippert et al. |
| 3,166,332 A | | 1/1965 | Olson |
| 3,191,617 A | | 6/1965 | Maddox |
| 3,224,817 A | | 12/1965 | Carter |
| 3,276,390 A | | 10/1966 | Bloudoff |
| 3,277,837 A | | 10/1966 | Pangburn |
| 3,288,475 A | | 11/1966 | Benoit |
| 3,459,363 A | | 8/1969 | Miller |
| 3,474,808 A | | 10/1969 | Elliott |
| 3,483,885 A | | 12/1969 | Leathers |
| 3,489,098 A | | 1/1970 | Roth |
| 3,489,170 A | | 1/1970 | Leman |
| 3,512,787 A | | 5/1970 | Kennedy |
| 3,590,387 A | | 6/1971 | Landis |
| 3,638,956 A | | 2/1972 | Dagwell |
| 3,640,501 A | | 2/1972 | Walton |
| 3,652,098 A | | 3/1972 | Kawazu et al. |
| 3,698,726 A | | 10/1972 | Schettler |
| 3,738,665 A | | 6/1973 | Bilco |
| 3,785,659 A | | 1/1974 | Maurer et al. |
| 3,809,508 A | | 5/1974 | Uchiyama |
| 3,837,356 A | | 9/1974 | Selep et al. |
| 3,847,511 A | | 11/1974 | Cole |
| 3,907,307 A | | 9/1975 | Maurer |
| 3,920,252 A | * | 11/1975 | Dechavanne ........ F16J 15/3232 277/491 |
| 3,931,755 A | | 1/1976 | Hatridge |
| 4,035,107 A | | 7/1977 | Kesten et al. |
| 4,044,834 A | | 8/1977 | Perkins |
| 4,076,212 A | | 2/1978 | Leman |
| 4,160,627 A | | 7/1979 | Cole |
| 4,161,187 A | | 7/1979 | Bauer |
| 4,184,814 A | | 1/1980 | Parker |
| 4,191,386 A | | 3/1980 | Hershey |
| 4,219,204 A | | 8/1980 | Pippert |
| 4,277,229 A | | 7/1981 | Pacht |
| 4,306,728 A | | 12/1981 | Huperz |
| 4,331,741 A | | 5/1982 | Wilson |
| 4,395,050 A | | 7/1983 | Wirz |
| 4,398,731 A | | 8/1983 | Gorman |
| 4,399,871 A | | 8/1983 | Adkins et al. |
| 4,406,336 A | | 9/1983 | Olsen |
| 4,440,404 A | | 4/1984 | Roach |
| 4,500,267 A | | 2/1985 | Birdwell |
| 4,508,133 A | | 4/1985 | Hamid |
| 4,518,359 A | | 5/1985 | Yao-Psong |
| 4,527,806 A | | 7/1985 | Ungchusri |
| 4,565,297 A | | 1/1986 | Korner |
| 4,580,791 A | | 4/1986 | DiRusso |
| 4,586,569 A | | 5/1986 | Hyde |
| 4,662,392 A | | 5/1987 | Vadasz |
| 4,716,924 A | | 1/1988 | Pacht |
| 4,754,950 A | | 7/1988 | Tada |
| 4,763,876 A | | 8/1988 | Oda |
| 4,768,933 A | | 9/1988 | Stachowiak |
| 4,770,206 A | | 9/1988 | Sjoberg |
| 4,807,890 A | | 2/1989 | Gorman |
| 4,811,758 A | | 3/1989 | Piper |
| 4,822,058 A | | 4/1989 | Butler et al. |
| 4,856,758 A | | 8/1989 | Knapp |
| 4,861,241 A | | 8/1989 | Gamboa |
| 4,872,395 A | | 10/1989 | Bennitt et al. |
| 4,878,815 A | | 11/1989 | Stachowiak |
| 4,911,410 A | | 3/1990 | Baker |
| 4,919,719 A | | 4/1990 | Abe |
| 4,928,921 A | | 5/1990 | Steele |
| 4,951,707 A | | 8/1990 | Johnson |
| 5,020,490 A | | 6/1991 | Seko |
| 5,052,435 A | | 10/1991 | Crudup |
| 5,061,159 A | | 10/1991 | Pryor |
| 5,062,450 A | | 11/1991 | Bailey |
| 5,073,096 A | | 12/1991 | King et al. |
| 5,080,713 A | | 1/1992 | Ishibashi |
| 5,088,521 A | | 2/1992 | Johnson |
| 5,127,807 A | | 7/1992 | Eslinger |
| 5,131,666 A | | 7/1992 | Hutchens |
| 5,135,238 A | | 8/1992 | Wells |
| 5,149,107 A | | 9/1992 | Maringer |
| 5,201,491 A | | 4/1993 | Domangue |
| 5,209,495 A | | 5/1993 | Palmour |
| 5,209,497 A | | 5/1993 | Von Bergen |
| 5,249,600 A | | 10/1993 | Blume |
| 5,267,736 A | | 12/1993 | Pietsch |
| 5,273,570 A | | 12/1993 | Sato |
| 5,284,320 A | | 2/1994 | Michael et al. |
| 5,297,805 A | * | 3/1994 | Merkin .................. F16J 15/022 277/540 |
| 5,299,812 A | | 4/1994 | Brestel |
| 5,314,659 A | | 5/1994 | Hidaka |
| 5,316,086 A | | 5/1994 | DeMoss |
| 5,362,215 A | | 11/1994 | King |
| 5,370,362 A | | 12/1994 | Kent et al. |
| 5,382,057 A | | 1/1995 | Richter |
| 5,398,715 A | | 3/1995 | Pacht |
| 5,478,048 A | | 12/1995 | Salesky |
| 5,493,951 A | | 2/1996 | Harrison |
| 5,526,878 A | | 6/1996 | Duell et al. |
| 5,533,245 A | | 7/1996 | Stanton |
| 5,540,570 A | | 7/1996 | Schuller |
| 5,549,160 A | | 8/1996 | Bownes et al. |
| 5,572,920 A | | 11/1996 | Kennedy |

(56) References Cited

U.S. PATENT DOCUMENTS 5,593,166 A 1/1997 Lovell et al.
5,622,371 A * 4/1997 Angelo .................... F16J 15/20 277/535
5,626,345 A 5/1997 Wallace
5,636,688 A 6/1997 Bassinger
5,674,449 A 10/1997 Liang
5,806,858 A 9/1998 Harrelson, III
5,823,510 A 10/1998 Muramatsu et al.
5,834,664 A 11/1998 Aonuma
5,859,376 A 1/1999 Ishibashi
5,895,517 A 4/1999 Kawamura
5,924,853 A 7/1999 Pacht
5,949,003 A 9/1999 Aoki
5,957,208 A 9/1999 Schnatzmeyer
6,004,372 A 12/1999 Quets
6,070,608 A 6/2000 Pringle
6,125,810 A 10/2000 Haselkorn
6,139,599 A 10/2000 Takahashi
6,200,688 B1 3/2001 Liang
6,209,445 B1 4/2001 Roberts, Jr.
6,251,157 B1 6/2001 Aoki et al.
6,328,112 B1 12/2001 Malone
6,328,312 B1 12/2001 Schmitz
6,340,377 B1 1/2002 Kawata
6,382,940 B1 5/2002 Blume
6,386,548 B1 5/2002 Grimanis et al.
6,422,317 B1 7/2002 Williamson, Jr.
6,431,521 B1 8/2002 Jones
6,436,338 B1 8/2002 Qiao
6,446,939 B1 9/2002 Hoppe
6,454,015 B1 9/2002 Armstrong et al.
6,460,620 B1 10/2002 LaFleur
6,464,749 B1 10/2002 Kawase
6,482,275 B1 11/2002 Qiao
6,485,678 B1 11/2002 Liang
6,544,012 B1 4/2003 Blume
6,571,684 B1 6/2003 Nov et al.
6,623,259 B1 9/2003 Blume
6,634,236 B2 10/2003 Mars
6,641,112 B2 11/2003 Antoff
6,695,007 B2 2/2004 Vicars
6,702,905 B1 3/2004 Qiao
6,712,871 B2 3/2004 Oh
6,715,558 B2 4/2004 Williamson
6,715,693 B1 4/2004 Dam et al.
6,796,321 B2 9/2004 Vicars
6,880,802 B2 4/2005 Hara
6,910,871 B1 6/2005 Blume
6,916,444 B1 7/2005 Liang
6,951,165 B2 10/2005 Kuhn
6,951,579 B2 10/2005 Koyama
6,955,181 B1 10/2005 Blume
6,959,732 B2 11/2005 Cotton, III et al.
6,959,916 B2 11/2005 Chigasaki
7,000,632 B2 2/2006 McIntire
7,028,928 B2 4/2006 Shinogle
7,036,824 B2 5/2006 Kunz
7,144,440 B2 12/2006 Ando
7,168,440 B1 1/2007 Blume
7,186,097 B1 3/2007 Blume
7,222,837 B1 5/2007 Blume
7,290,560 B2 11/2007 Orr
7,296,591 B2 11/2007 Moe
7,335,002 B2 2/2008 Vicars
7,341,435 B2 3/2008 Vicars
7,398,955 B2 7/2008 Weingarten
7,506,574 B2 3/2009 Jensen
7,513,483 B1 4/2009 Blume
7,513,759 B1 4/2009 Blume
7,520,329 B2 4/2009 Reid et al.
7,562,675 B2 7/2009 Nomichi et al.
7,572,312 B2 8/2009 Kawata et al.
7,611,590 B2 11/2009 Liang
7,681,589 B2 3/2010 Schwegman
7,682,471 B2 3/2010 Levin
7,726,026 B1 6/2010 Blume
7,748,310 B2 7/2010 Kennedy
7,754,142 B2 7/2010 Liang
7,754,143 B2 7/2010 Qiao
7,757,396 B2 7/2010 Sawada
7,789,133 B2 9/2010 McGuire
7,789,161 B2 9/2010 Riley
7,793,913 B2 9/2010 Hara
7,828,053 B2 11/2010 McGuire
7,845,413 B2 12/2010 Shampine
7,861,738 B2 1/2011 Erbes
7,866,346 B1 1/2011 Walters
7,891,374 B2 2/2011 Vicars
7,931,078 B2 4/2011 Toporowski et al.
7,954,510 B2 6/2011 Schwegman
7,992,635 B2 8/2011 Cherewyk
8,020,638 B2 9/2011 Chellappa et al.
8,069,923 B2 12/2011 Blanco
8,075,000 B2 12/2011 James et al.
8,075,661 B2 12/2011 Chen
8,083,506 B2 12/2011 Maki
8,100,407 B2 1/2012 Stanton
8,141,849 B1 3/2012 Blume
8,146,889 B2 4/2012 Hunter
8,147,227 B1 4/2012 Blume
8,181,970 B2 5/2012 Smith
8,201,832 B2 6/2012 Kocurek
8,261,771 B2 9/2012 Witkowski
8,287,256 B2 10/2012 Shafer
8,291,927 B2 10/2012 Johnson
8,292,301 B1 10/2012 Gilstad et al.
8,312,805 B1 11/2012 Blume
8,317,498 B2 11/2012 Gambier
8,328,202 B2 12/2012 Foster et al.
8,375,980 B2 2/2013 Higashiyama
8,376,723 B2 2/2013 Kugelev
8,402,880 B2 3/2013 Patel
8,408,886 B2 4/2013 Fabbri
8,430,075 B2 4/2013 Qiao
D687,125 S 7/2013 Hawes
8,479,700 B2 7/2013 Qiao
8,511,218 B2 8/2013 Cordes
8,511,219 B2 8/2013 Tackett
8,522,667 B2 9/2013 Clemens
8,528,585 B2 9/2013 McGuire
8,529,230 B1 9/2013 Colley, III et al.
8,534,691 B2 9/2013 Schaffer
8,613,886 B2 12/2013 Qiao
D700,682 S 3/2014 Bayyouk et al.
8,662,864 B2 3/2014 Bayyouk
8,662,865 B2 3/2014 Bayyouk
8,668,012 B2 3/2014 Porter et al.
8,668,470 B2 3/2014 Bayyouk
8,707,853 B1 4/2014 Dille
8,733,313 B2 5/2014 Sato
8,784,081 B1 7/2014 Blume
8,814,139 B2 8/2014 Griffin et al.
8,814,432 B2 8/2014 Thoma et al.
8,828,312 B2 9/2014 Yao
8,870,554 B2 10/2014 Kent
8,888,069 B2 11/2014 Maruno et al.
8,893,806 B2 11/2014 Williamson
8,894,392 B1 11/2014 Blume
8,915,722 B1 12/2014 Blume
8,940,110 B2 1/2015 Qiao
8,955,850 B2 2/2015 Saucerman et al.
8,978,695 B2 3/2015 Witkowkski
8,998,593 B2 4/2015 Vicars
9,010,412 B2 4/2015 McGuire
9,016,693 B1 4/2015 Shek et al.
9,067,346 B2 6/2015 Kohn et al.
9,103,448 B2 8/2015 Witkowski
9,121,503 B2 9/2015 Dietle et al.
9,150,945 B2 10/2015 Bei
9,157,136 B2 10/2015 Chou
9,157,297 B2 10/2015 Williamson, Jr.
9,157,468 B2 10/2015 Dille
9,188,242 B2 11/2015 Giove et al.
9,206,910 B2 12/2015 Kahn

(56) References Cited

U.S. PATENT DOCUMENTS

D748,228 S 1/2016 Bayyouk
9,243,630 B2 1/2016 Foote
9,260,933 B2 2/2016 Artherholt
9,261,195 B2 2/2016 Toynbee
9,273,543 B2 3/2016 Baca
9,284,631 B2 3/2016 Radon
9,284,953 B2 3/2016 Blume
9,285,040 B2 3/2016 Forrest
9,291,274 B1 3/2016 Blume
9,322,243 B2 4/2016 Baca
9,334,547 B2 5/2016 Qiao
9,340,856 B2 5/2016 Otobe
9,341,039 B2 5/2016 Galle et al.
9,341,272 B2 5/2016 Hoang
9,359,921 B2 6/2016 Hashimoto
9,360,115 B2 6/2016 Chaplin et al.
9,365,913 B2 6/2016 Imaizumi
9,371,919 B2 6/2016 Forrest
9,376,930 B2 6/2016 Kim
9,377,019 B1 6/2016 Blume
9,382,940 B2 7/2016 Lee
9,410,396 B2 8/2016 Møgedal
9,416,887 B2 8/2016 Blume
9,435,454 B2 9/2016 Blume
9,441,776 B2 9/2016 Bryne
9,458,743 B2 10/2016 Qiao
9,464,730 B2 10/2016 Bihlet
9,500,195 B2 11/2016 Blume
9,506,382 B2 11/2016 Yeager
9,528,349 B2 12/2016 Zimmerman
9,528,508 B2 12/2016 Thomeer
9,528,631 B2 12/2016 McCarty
9,534,473 B2 1/2017 Morris
9,534,691 B2 1/2017 Miller
9,556,761 B2 1/2017 Koyama
9,568,138 B2 2/2017 Arizpe
9,605,767 B2 3/2017 Chhabra
9,631,739 B2 4/2017 Belshan
D787,029 S 5/2017 Bayyouk
9,638,075 B2 5/2017 Qiao
9,638,337 B2 5/2017 Witkowski
9,650,882 B2 5/2017 Zhang
9,651,067 B2 5/2017 Beschorner
9,677,378 B2 6/2017 Asthana et al.
9,689,364 B2 6/2017 Mack
9,695,812 B2 7/2017 Dille
9,732,746 B2 8/2017 Chandrasekaran
9,732,880 B2 8/2017 Haines
9,745,968 B2 8/2017 Kotapish
9,784,262 B2 10/2017 Bayyouk
9,791,082 B2 10/2017 Baxter et al.
9,816,348 B2 11/2017 Asthana et al.
9,822,606 B2 11/2017 Williamson, Jr.
9,822,894 B2 11/2017 Bayyouk
9,845,801 B1 12/2017 Shek
9,857,807 B2 1/2018 Baca
9,915,250 B2 3/2018 Brasche
9,920,615 B2 3/2018 Zhang
9,927,036 B2 3/2018 Dille
9,945,362 B2 4/2018 Skurdalsvold
9,945,375 B2 4/2018 Zhang
9,957,770 B2 5/2018 Averill et al.
9,976,401 B2 5/2018 Walton et al.
9,989,044 B2 6/2018 Bayyouk
10,029,540 B2 7/2018 Seeger
D826,281 S 8/2018 Mead
10,041,490 B1 8/2018 Jahnke
10,082,137 B2 9/2018 Graham
10,094,478 B2 10/2018 Iijima
10,113,679 B2 10/2018 Shuck
10,145,205 B2 12/2018 Martino et al.
10,180,058 B2 1/2019 Carter
10,184,470 B2 1/2019 Barnett, Jr.
10,190,197 B2 1/2019 Baker
10,197,172 B2 2/2019 Fuller
10,203,037 B2 2/2019 Hunter et al.
10,215,172 B2 2/2019 Wood
10,221,848 B2 3/2019 Bayyouk
10,240,594 B2 3/2019 Barnhouse, Jr.
10,240,597 B2 3/2019 Bayyouk
10,247,182 B2 4/2019 Zhang
10,247,184 B2 4/2019 Chunn
10,260,634 B2 4/2019 Lenhert et al.
10,273,954 B2 4/2019 Brown
10,288,178 B2 5/2019 Nowell
10,309,182 B2 6/2019 Jones et al.
10,316,832 B2 6/2019 Byrne
10,330,097 B2 6/2019 Skurdalsvold
10,344,757 B1 7/2019 Stark
10,364,487 B2 7/2019 Park
D856,498 S 8/2019 Bayyouk
10,378,535 B2 8/2019 Mahmood
10,378,538 B2 8/2019 Blume
10,378,659 B2 8/2019 Scott et al.
10,393,113 B2 8/2019 Wagner
10,400,764 B2 9/2019 Wagner
10,415,348 B2 9/2019 Zhang
10,415,719 B2 9/2019 Leboeuf et al.
D861,834 S 10/2019 Foster et al.
D864,691 S 10/2019 Campos
10,428,406 B2 10/2019 Yao
10,428,949 B2 10/2019 Miller
10,435,987 B2 10/2019 Poluchalla et al.
10,436,193 B1 10/2019 Jahnke
10,443,456 B2 10/2019 Hoeg
10,465,680 B1 11/2019 Guerra
10,472,702 B2 11/2019 Yeh
10,487,528 B2 11/2019 Pozybill
D871,455 S 12/2019 Crowsley
10,519,070 B2 12/2019 Sanders
10,519,950 B2 12/2019 Foster
10,526,862 B2 1/2020 Witkowski
10,527,036 B2 1/2020 Blume
10,533,240 B2 1/2020 Veliz et al.
10,557,446 B2 2/2020 Stecklein
10,557,576 B2 2/2020 Witkowski
10,557,580 B2 2/2020 Mendyk
10,563,494 B2 2/2020 Graham
10,563,649 B2 2/2020 Zhang
10,570,491 B2 2/2020 Hong
10,576,538 B2 3/2020 Kato
10,577,580 B2 3/2020 Abbas
10,577,850 B2 3/2020 Ozkan
10,591,070 B2 3/2020 Nowell
10,605,374 B2 3/2020 Takaki
D880,661 S 4/2020 Foster et al.
D881,958 S 4/2020 Han
10,626,856 B2 4/2020 Coldren
10,628,744 B2 4/2020 Surjaatmadja et al.
10,633,925 B2 4/2020 Panda
10,634,260 B2 4/2020 Said
10,640,854 B2 5/2020 Hu
10,655,623 B2 5/2020 Blume
10,655,743 B2 5/2020 Hagen
10,663,071 B2 5/2020 Bayyouk
10,670,013 B2 6/2020 Foster
10,670,153 B2 6/2020 Filipow
10,670,176 B2 6/2020 Byrne
10,677,109 B2 6/2020 Qiao
10,677,240 B2 6/2020 Graham
10,677,365 B2 6/2020 Said
10,711,567 B2 7/2020 Buckley
10,711,754 B2 7/2020 Nelson
10,711,778 B2 7/2020 Buckley
10,718,441 B2 7/2020 Myers
D893,684 S 8/2020 Matthys
10,731,523 B2 8/2020 Qu
10,731,643 B2 8/2020 DeLeon
10,738,928 B2 8/2020 Arizpe
10,753,490 B2 8/2020 Fuller
10,753,495 B2 8/2020 Bayyouk
D895,777 S 9/2020 Chase
10,760,567 B2 9/2020 Salih et al.
10,767,520 B1 9/2020 Hattiangadi

(56) References Cited

U.S. PATENT DOCUMENTS 10,771,567 B2 9/2020 Sundaresan
10,774,828 B1 9/2020 Smith
10,781,803 B2 9/2020 Kumar
10,787,725 B2 9/2020 Fujieda
10,801,627 B2 10/2020 Warbey
10,808,488 B2 10/2020 Witkowski
10,808,851 B1 10/2020 Surjaatmadja et al.
10,815,988 B2 10/2020 Buckley
10,815,989 B2 10/2020 Naedler et al.
10,830,360 B2 11/2020 Frank
10,837,556 B2 11/2020 Chase et al.
10,851,775 B2 12/2020 Stark
10,865,325 B2 12/2020 Nakao
10,895,325 B2 1/2021 Nowell et al.
D910,820 S 2/2021 Grassl
10,907,738 B2 2/2021 Nowell
10,914,171 B2 2/2021 Foster
10,914,383 B2 2/2021 Kustermans et al.
10,934,899 B2 3/2021 Hattiangadi
10,941,765 B2 3/2021 Nowell
10,941,866 B2 3/2021 Nowell
10,954,938 B2 3/2021 Stark
10,961,607 B2 3/2021 Oshima
10,962,001 B2 3/2021 Nowell
D915,197 S 4/2021 Katano
D916,240 S 4/2021 Nowell
10,968,717 B2 4/2021 Tran
10,988,834 B2 4/2021 Lee
10,989,321 B2 4/2021 Hattiangadi
10,995,738 B2 5/2021 Blume
11,002,120 B1 * 5/2021 Surjaatmadja ........... F16J 15/24
11,009,016 B2 5/2021 Berend
11,028,662 B2 6/2021 Rhodes
11,041,570 B1 6/2021 Buckley
11,073,144 B1 7/2021 Hurst et al.
11,078,903 B2 8/2021 Nowell
11,104,981 B2 8/2021 Chen
11,105,185 B2 8/2021 Spencer
11,105,327 B2 8/2021 Hurst
11,105,328 B2 8/2021 Bryne
11,105,428 B2 8/2021 Warbey
11,111,915 B2 9/2021 Bayyouk
11,131,397 B2 9/2021 Yan
D933,104 S 10/2021 Ellisor
D933,105 S 10/2021 Ellisor
D933,106 S 10/2021 Mullins
D933,107 S 10/2021 Mullins
11,143,305 B1 10/2021 Matthys
11,149,514 B2 10/2021 Witkowski
11,149,856 B2 10/2021 Mattoni et al.
11,156,221 B2 10/2021 Stark et al.
11,162,479 B2 11/2021 Thomas et al.
11,162,859 B2 11/2021 Lei
11,173,590 B2 11/2021 Tyler
11,181,101 B2 11/2021 Byrne
11,181,108 B2 11/2021 Brooks
11,225,963 B2 1/2022 Naedler et al.
11,231,111 B2 1/2022 Hurst
11,242,849 B1 2/2022 Smith
11,286,737 B2 3/2022 Gunasekaran
D949,202 S 4/2022 Sharpstone
11,300,111 B2 4/2022 Thomas et al.
11,313,189 B2 4/2022 Dawsey et al.
11,333,249 B2 5/2022 Jones et al.
11,353,117 B1 6/2022 Smith
11,359,615 B2 6/2022 Thomas et al.
11,384,756 B1 7/2022 Smith
11,391,374 B1 7/2022 Ellisor
11,421,679 B1 8/2022 Mullins
11,421,680 B1 8/2022 Smith
11,434,714 B2 9/2022 Machocki
11,434,900 B1 9/2022 Alex
11,441,683 B2 9/2022 Mullins et al.
11,454,083 B2 9/2022 Asthana et al.
11,454,321 B2 9/2022 Mullins et al.
11,473,395 B2 10/2022 Yeldell et al.
11,473,686 B2 10/2022 Bayyouk
11,512,545 B2 11/2022 Yuan et al.
11,519,225 B2 12/2022 Winslow et al.
11,566,481 B2 1/2023 Chambers et al.
11,566,713 B2 1/2023 Poremski
11,566,718 B2 1/2023 Singley et al.
D980,876 S 3/2023 Smith
11,608,896 B2 3/2023 Al-Darra
D986,928 S 5/2023 Smith et al.
11,644,106 B2 5/2023 Williams et al.
11,668,163 B2 6/2023 Asthana et al.
11,692,544 B2 7/2023 Chase
D997,992 S 9/2023 Smith et al.
11,746,778 B2 9/2023 Bayyouk
11,761,441 B1 9/2023 Alex et al.
D1,006,059 S 11/2023 Waniek
11,840,453 B2 12/2023 Vlassoff et al.
11,846,356 B1 12/2023 Ellisor
11,859,723 B2 1/2024 Surjaatmadja et al.
11,891,988 B2 2/2024 Mullins et al.
11,898,408 B2 2/2024 Jamison et al.
11,913,447 B1 2/2024 Wiegand et al.
11,920,684 B1 3/2024 Xu et al.
11,938,592 B2 3/2024 Dearborn et al.
D1,022,145 S 4/2024 Meyers
11,952,865 B2 4/2024 Fripp et al.
11,988,294 B2 5/2024 Qiao et al.
D1,031,952 S 6/2024 Huntley
12,018,759 B1 6/2024 Patel et al.
D1,036,632 S 7/2024 Suzuki
12,038,086 B2 7/2024 Shuck
12,049,889 B2 7/2024 Ellisor et al.
D1,039,657 S 8/2024 Cox
12,055,221 B2 8/2024 Ellisor et al.
12,092,226 B2 9/2024 Elliott et al.
12,092,227 B1 9/2024 Belshan
12,140,005 B2 11/2024 Brown et al.
12,140,240 B1 11/2024 Xu
D1,061,623 S 2/2025 Newberg et al.
D1,063,005 S 2/2025 Lorkowski
12,247,557 B2 3/2025 Avey et al.
12,247,561 B2 3/2025 Avey et al.
12,263,503 B2 4/2025 Mittag et al.
12,263,549 B2 4/2025 Noreiga et al.
12,270,394 B2 4/2025 Ellisor et al.
12,270,477 B2 4/2025 Pauchet et al.
12,292,120 B1 5/2025 Mullins et al.
12,292,121 B2 5/2025 Berryhill
12,297,922 B1 5/2025 Xu
12,345,253 B2 7/2025 Mullins et al.
12,345,332 B2 7/2025 Ellisor
12,366,244 B2 7/2025 Alex et al.
12,366,245 B1 7/2025 Ellisor et al.
12,404,931 B2 9/2025 Ellisor et al.
12,404,942 B2 9/2025 Hurst et al.
12,460,488 B2 11/2025 Uddin et al.
12,473,910 B2 11/2025 Foster et al.
12,480,489 B2 11/2025 Ellisor et al.
12,486,901 B1 * 12/2025 Naedler .................. F16J 15/18
12,498,051 B2 12/2025 Xu et al.
12,510,164 B1 12/2025 Mullins et al.
D1,113,987 S 2/2026 Mullins et al.
12,540,673 B2 2/2026 Ellisor
12,669,191 B1 6/2026 Xu
12,692,945 B2 7/2026 Mullins et al.
2002/0084004 A1 7/2002 Takahashi
2002/0124961 A1 9/2002 Porter
2002/0159914 A1 10/2002 Yeh
2003/0205864 A1 11/2003 Dietle
2003/0233910 A1 12/2003 Jeong
2004/0108116 A1 6/2004 McLoughlin et al.
2004/0161351 A1 8/2004 Forrest
2004/0170507 A1 9/2004 Vicars
2004/0194576 A1 10/2004 Ando
2004/0234404 A1 11/2004 Vicars
2004/0255410 A1 12/2004 Schonewille
2004/0258557 A1 12/2004 Shun
2005/0095156 A1 5/2005 Wolters

(56) References Cited

U.S. PATENT DOCUMENTS

2005/0098963 A1 5/2005 Olsen
2005/0126638 A1 6/2005 Gilbert
2005/0200081 A1 9/2005 Stanton
2005/0226754 A1 10/2005 Orr
2006/0002806 A1 1/2006 Baxter
2006/0027779 A1 2/2006 McGuire
2006/0045782 A1 3/2006 Kretzinger
2007/0086910 A1 4/2007 Liang
2007/0154342 A1 7/2007 Tu
2007/0261746 A1 11/2007 Nomichi et al.
2007/0273105 A1 11/2007 Stanton
2007/0295411 A1 12/2007 Schwegman
2008/0031769 A1 2/2008 Yeh
2008/0042369 A1 2/2008 Krywitsky et al.
2008/0052014 A1 2/2008 Toyosada
2008/0092384 A1 4/2008 Schaake
2008/0240949 A1 10/2008 Tackett et al.
2008/0279706 A1 11/2008 Gambier
2009/0041611 A1 2/2009 Sathian
2009/0166980 A1 7/2009 Miller et al.
2009/0261575 A1 10/2009 Bull
2009/0278069 A1 11/2009 Blanco
2009/0289209 A1 11/2009 Comeaux et al.
2010/0143163 A1 6/2010 Patel et al.
2010/0230628 A1 9/2010 Stefina
2010/0242720 A1 9/2010 Matzner
2010/0272597 A1 10/2010 Qiao
2011/0079302 A1 4/2011 Hawes
2011/0142701 A1 6/2011 Small
2011/0173814 A1 7/2011 Patel
2011/0189040 A1 8/2011 Vicars
2011/0255993 A1 10/2011 Ochoa
2011/0266752 A1 11/2011 Kocurek
2011/0296982 A1 12/2011 Dille et al.
2012/0141308 A1 6/2012 Saini
2012/0157786 A1 6/2012 Pribanic
2012/0163969 A1 6/2012 Ongole
2012/0259593 A1 10/2012 El-Zein
2012/0292550 A1 11/2012 Meek
2012/0304821 A1 12/2012 Ando
2013/0020521 A1 1/2013 Byrne
2013/0037739 A1 2/2013 Millard
2013/0202457 A1 8/2013 Bayyouk
2013/0202458 A1 8/2013 Byrne
2013/0263932 A1 10/2013 Baxter et al.
2013/0319220 A1 12/2013 Luharuka
2014/0083541 A1 3/2014 Chandrasekaran
2014/0083547 A1 3/2014 Hwang
2014/0196883 A1 7/2014 Artherholt
2014/0260954 A1 9/2014 Young
2014/0264134 A1 9/2014 Butler et al.
2014/0286805 A1 9/2014 Dyer
2014/0319780 A1 10/2014 Vertenten
2014/0322034 A1 10/2014 Bayyouk
2014/0322050 A1 10/2014 Marette et al.
2014/0348677 A1 11/2014 Moeller
2015/0060715 A1 3/2015 Hoang
2015/0127308 A1 5/2015 Thomas, Jr. et al.
2015/0132157 A1 5/2015 Whaley
2015/0144826 A1 5/2015 Bayyouk
2015/0147194 A1 5/2015 Foote
2015/0219096 A1 8/2015 Jain
2015/0300332 A1 10/2015 Kotapish
2015/0353856 A1 12/2015 Kleyman et al.
2015/0368775 A1 12/2015 Baker
2015/0377356 A1 12/2015 Miller
2016/0097459 A1 4/2016 Veliz et al.
2016/0201169 A1 7/2016 Vecchio
2016/0215588 A1 7/2016 Belshan
2016/0238156 A1 8/2016 Hubenschmidt
2016/0245280 A1 8/2016 Todorov
2016/0258433 A1 9/2016 Belshan et al.
2016/0319626 A1 11/2016 Dille
2016/0319805 A1 11/2016 Dille
2016/0327165 A1 11/2016 Sundararajan
2017/0051738 A1 2/2017 Horning
2017/0067459 A1 3/2017 Bayyouk
2017/0089334 A1 3/2017 Jahnke
2017/0089470 A1 3/2017 Filipow et al.
2017/0089473 A1 3/2017 Nowell
2017/0097107 A1 4/2017 Hotz
2017/0102101 A1 4/2017 Duval-Arnould
2017/0122055 A1 5/2017 Embury
2017/0159655 A1 6/2017 Morreale
2017/0175799 A1 6/2017 Arnold
2017/0204852 A1 7/2017 Barnett, Jr.
2017/0211708 A1 7/2017 Kim
2017/0218951 A1 8/2017 Graham
2017/0218993 A1 8/2017 Freed
2017/0268674 A1 9/2017 Barbera et al.
2017/0297149 A1 10/2017 Shinohara
2017/0298932 A1 10/2017 Wagner
2017/0314097 A1 11/2017 Hong
2017/0342776 A1 11/2017 Bullock
2017/0342976 A1 11/2017 Reddy
2018/0017173 A1 1/2018 Nowell
2018/0045318 A1* 2/2018 Tanida ................ F16J 15/3244
2018/0058431 A1 3/2018 Blume
2018/0073653 A1 3/2018 Bayyouk
2018/0073654 A1 3/2018 Nowell et al.
2018/0202434 A1 7/2018 Barnhouse, Jr.
2018/0238459 A1 8/2018 Nowell et al.
2018/0258721 A1 9/2018 Pawar et al.
2018/0298481 A1 10/2018 Kleyman et al.
2018/0298894 A1 10/2018 Wagner
2018/0312946 A1 11/2018 Gigliotti, Jr.
2018/0320258 A1 11/2018 Stewart
2018/0340245 A1 11/2018 Kernion
2018/0354081 A1 12/2018 Kalyani
2019/0011051 A1 1/2019 Yeung
2019/0017503 A1 1/2019 Foster
2019/0024198 A1 1/2019 Hong
2019/0024225 A1 1/2019 Tang
2019/0032685 A1 1/2019 Foster
2019/0032720 A1 1/2019 Bayyouk
2019/0040966 A1 2/2019 Myers et al.
2019/0047049 A1 2/2019 Fujieda
2019/0049052 A1 2/2019 Shuck
2019/0063427 A1 2/2019 Nowell
2019/0063430 A1 2/2019 Byrne
2019/0071755 A1 3/2019 Lee
2019/0072088 A1 3/2019 DeLeon
2019/0072089 A1 3/2019 Buckley
2019/0085806 A1 3/2019 Meibgeier
2019/0085978 A1 3/2019 Chase
2019/0101109 A1 4/2019 Cortes
2019/0107226 A1 4/2019 Bayyouk
2019/0120389 A1 4/2019 Foster
2019/0136842 A1 5/2019 Nowell
2019/0145400 A1 5/2019 Graham
2019/0145568 A1 5/2019 Nick
2019/0154033 A1 5/2019 Brooks
2019/0170137 A1 6/2019 Chase
2019/0170138 A1 6/2019 Bayyouk
2019/0194786 A1 6/2019 Chuang
2019/0226058 A1 7/2019 Fujieda
2019/0226476 A1 7/2019 Stark et al.
2019/0242373 A1 8/2019 Wernig
2019/0247957 A1 8/2019 Stribling
2019/0264683 A1 8/2019 Smith
2019/0292633 A1 9/2019 Porret
2019/0301314 A1 10/2019 Kamo
2019/0301447 A1 10/2019 Skurdalsvold
2019/0316685 A1 10/2019 Wang
2019/0331245 A1 10/2019 Gable et al.
2019/0360483 A1 11/2019 Nowell
2019/0368614 A1 12/2019 Hurst
2019/0368619 A1 12/2019 Barnett et al.
2019/0376508 A1 12/2019 Wagner
2020/0041001 A1 2/2020 Minami
2020/0056272 A1 2/2020 Hong
2020/0063899 A1 2/2020 Witkowski
2020/0070034 A1 3/2020 Sukup et al.
2020/0072369 A1 3/2020 Singley et al.

(56) References Cited

U.S. PATENT DOCUMENTS

| | | | |
|---|---|---|---|
| 2020/0080660 | A1 | 3/2020 | Dyer |
| 2020/0080661 | A1 | 3/2020 | Mullins |
| 2020/0132195 | A1 | 4/2020 | Coombs |
| 2020/0157663 | A1 | 5/2020 | Yang |
| 2020/0158123 | A1 | 5/2020 | Chen |
| 2020/0173317 | A1 | 6/2020 | Keating |
| 2020/0208776 | A1 | 7/2020 | Bayyouk |
| 2020/0217424 | A1 | 7/2020 | Rasmussen |
| 2020/0232455 | A1 | 7/2020 | Blume |
| 2020/0240531 | A1 | 7/2020 | Nowell |
| 2020/0256149 | A1 | 8/2020 | Witkowski |
| 2020/0284253 | A1 | 9/2020 | Foster |
| 2020/0284365 | A1 | 9/2020 | Bayyouk |
| 2020/0290118 | A1 | 9/2020 | Chen |
| 2020/0291731 | A1 | 9/2020 | Haiderer |
| 2020/0300240 | A1 | 9/2020 | Nowell |
| 2020/0300367 | A1 | 9/2020 | Caglio et al. |
| 2020/0308683 | A1 | 10/2020 | Xue |
| 2020/0340314 | A1 | 10/2020 | Yeldell et al. |
| 2020/0347843 | A1 | 11/2020 | Mullins |
| 2020/0355182 | A1 | 11/2020 | DeLeon |
| 2020/0362970 | A1 | 11/2020 | Hurst |
| 2020/0362975 | A1 | 11/2020 | Hurst et al. |
| 2020/0386223 | A1 | 12/2020 | Hurst |
| 2020/0392613 | A1 | 12/2020 | Won |
| 2020/0393054 | A1 | 12/2020 | Fuller |
| 2020/0399979 | A1 | 12/2020 | Webster |
| 2020/0400003 | A1 | 12/2020 | Webster |
| 2020/0400130 | A1 | 12/2020 | Poehls |
| 2020/0400132 | A1 | 12/2020 | Kumar |
| 2020/0400140 | A1 | 12/2020 | Bayyouk |
| 2020/0400234 | A1 | 12/2020 | Mullins et al. |
| 2020/0400242 | A1 | 12/2020 | Spencer |
| 2021/0010113 | A1 | 1/2021 | Qiao |
| 2021/0010470 | A1 | 1/2021 | Blume |
| 2021/0017830 | A1 | 1/2021 | Witkowski |
| 2021/0017982 | A1 | 1/2021 | Bayyouk |
| 2021/0017983 | A1 | 1/2021 | Myers |
| 2021/0025497 | A1 | 1/2021 | Tsuji |
| 2021/0040836 | A1 | 2/2021 | Baskin |
| 2021/0054486 | A1 | 2/2021 | Kim |
| 2021/0062944 | A1 | 3/2021 | Lee |
| 2021/0102630 | A1 | 4/2021 | Nowell |
| 2021/0108734 | A1 | 4/2021 | Nowell |
| 2021/0130936 | A1 | 5/2021 | Wu |
| 2021/0146397 | A1 | 5/2021 | Mittag et al. |
| 2021/0148471 | A1 | 5/2021 | Murugesan |
| 2021/0180156 | A1 | 6/2021 | Kim |
| 2021/0190053 | A1 | 6/2021 | Wagner |
| 2021/0190223 | A1 | 6/2021 | Bayyouk |
| 2021/0197524 | A1 | 7/2021 | Maroli |
| 2021/0215071 | A1 | 7/2021 | Oikawa |
| 2021/0215154 | A1 | 7/2021 | Nowell |
| 2021/0222690 | A1 | 7/2021 | Beisel |
| 2021/0230987 | A1 | 7/2021 | Tanner |
| 2021/0239111 | A1 | 8/2021 | Zitting |
| 2021/0246537 | A1 | 8/2021 | Maroli |
| 2021/0260704 | A1 | 8/2021 | Hu |
| 2021/0270261 | A1 | 9/2021 | Zhang |
| 2021/0285551 | A1 | 9/2021 | Renollett |
| 2021/0310484 | A1 | 10/2021 | Myers |
| 2021/0381504 | A1 | 12/2021 | Wagner |
| 2021/0381615 | A1 | 12/2021 | Riedel |
| 2021/0388832 | A1 | 12/2021 | Byrne |
| 2022/0026326 | A1 | 1/2022 | Wang |
| 2022/0034402 | A1 | 2/2022 | Kiani |
| 2022/0056906 | A1 | 2/2022 | Lawson et al. |
| 2022/0065063 | A1 | 3/2022 | Xu et al. |
| 2022/0145934 | A1 | 5/2022 | Prevost et al. |
| 2022/0163031 | A1 | 5/2022 | Chase |
| 2022/0163032 | A1 | 5/2022 | Chase |
| 2022/0163118 | A1 | 5/2022 | Maffezzoli et al. |
| 2022/0186718 | A1* | 6/2022 | Peer ..................... F16J 15/3204 |
| 2022/0205470 | A1 | 6/2022 | Asthana et al. |
| 2022/0243723 | A1 | 8/2022 | Herold et al. |
| 2022/0282719 | A1 | 9/2022 | Barnhouse |
| 2022/0320790 | A1 | 10/2022 | Demaratos |
| 2022/0333707 | A1 | 10/2022 | Ting et al. |
| 2022/0349472 | A1 | 11/2022 | Ellisor |
| 2022/0390055 | A1 | 12/2022 | Ellisor |
| 2022/0403839 | A1 | 12/2022 | Mullins |
| 2023/0041201 | A1 | 2/2023 | Myers et al. |
| 2023/0047066 | A1 | 2/2023 | Barnett |
| 2023/0129538 | A1 | 4/2023 | Miller et al. |
| 2023/0130824 | A1 | 4/2023 | Belshan et al. |
| 2023/0138338 | A1 | 5/2023 | Barnhouse et al. |
| 2023/0184241 | A1 | 6/2023 | Avey et al. |
| 2023/0220840 | A1 | 7/2023 | Avey et al. |
| 2023/0258175 | A1 | 8/2023 | Figgs et al. |
| 2023/0279991 | A1 | 9/2023 | Avey et al. |
| 2023/0313890 | A1 | 10/2023 | Foster et al. |
| 2023/0332596 | A1 | 10/2023 | Chase |
| 2023/0383743 | A1 | 11/2023 | Brock et al. |
| 2023/0383859 | A1 | 11/2023 | Wiegand et al. |
| 2023/0399961 | A1 | 12/2023 | Nogami |
| 2023/0407864 | A1 | 12/2023 | Alex et al. |
| 2024/0042627 | A1 | 2/2024 | Wang et al. |
| 2024/0102460 | A1 | 3/2024 | Kachovskiy et al. |
| 2024/0117882 | A1 | 4/2024 | Ellisor |
| 2024/0133277 | A1 | 4/2024 | Brown et al. |
| 2024/0200656 | A1 | 6/2024 | Avey |
| 2024/0200666 | A1 | 6/2024 | Leake |
| 2024/0209945 | A1 | 6/2024 | Prate et al. |
| 2024/0262067 | A1 | 8/2024 | Iversen et al. |
| 2024/0309724 | A1 | 9/2024 | Miller et al. |
| 2024/0369139 | A1 | 11/2024 | Ellisor |
| 2024/0369141 | A1 | 11/2024 | Patel et al. |
| 2024/0376892 | A1 | 11/2024 | Ellisor |
| 2024/0376984 | A1 | 11/2024 | Ellisor |
| 2024/0384795 | A1 | 11/2024 | Barnett et al. |
| 2024/0418164 | A1 | 12/2024 | Peer |
| 2024/0418282 | A1 | 12/2024 | Featherstone et al. |
| 2025/0027486 | A1 | 1/2025 | Alex et al. |
| 2025/0052325 | A1 | 2/2025 | Berryhill |
| 2025/0075818 | A1 | 3/2025 | Xu |
| 2025/0207574 | A1 | 6/2025 | Foster et al. |
| 2025/0237308 | A1 | 7/2025 | Ellisor |
| 2025/0251044 | A1 | 8/2025 | Berryhill |
| 2025/0257798 | A1* | 8/2025 | Zitting ..................... F16J 15/20 |
| 2025/0277487 | A1 | 9/2025 | Ellisor et al. |
| 2025/0283463 | A1 | 9/2025 | Mullins et al. |
| 2025/0283464 | A1 | 9/2025 | Ellisor et al. |
| 2025/0305586 | A1 | 10/2025 | Mullins et al. |
| 2025/0320866 | A1 | 10/2025 | Barnett et al. |
| 2026/0002531 | A1 | 1/2026 | Peer et al. |
| 2026/0043491 | A1 | 2/2026 | Xu et al. |
| 2026/0078474 | A1 | 3/2026 | Verma et al. |
| 2026/0078754 | A1 | 3/2026 | Verma et al. |
| 2026/0126115 | A1 | 5/2026 | Ellisor et al. |
| 2026/0146601 | A1 | 5/2026 | Alex |
| 2026/0168490 | A1 | 6/2026 | Verma |
| 2026/0226987 | A1 | 8/2026 | Alex et al. |

FOREIGN PATENT DOCUMENTS

| | | | |
|---|---|---|---|
| CN | 2637843 | Y | 9/2004 |
| CN | 200971972 | Y | 11/2007 |
| CN | 101169190 | A | 4/2008 |
| CN | 201149099 | | 11/2008 |
| CN | 201401518 | Y | 2/2010 |
| CN | 201412533 | Y | 2/2010 |
| CN | 201610950 | U | 10/2010 |
| CN | 201621317 | U | 11/2010 |
| CN | 201687978 | U | 12/2010 |
| CN | 201705964 | U | 1/2011 |
| CN | 201705982 | U | 1/2011 |
| CN | 102212776 | A | 10/2011 |
| CN | 202182204 | U | 4/2012 |
| CN | 102537510 | A | 7/2012 |
| CN | 102748483 | | 10/2012 |
| CN | 202545162 | U | 11/2012 |
| CN | 102828141 | A | 12/2012 |
| CN | 202790585 | U | 3/2013 |
| CN | 202852048 | U | 4/2013 |

(56) References Cited

FOREIGN PATENT DOCUMENTS

| | | | |
|---|---|---|---|
| CN | 202884071 | U | 4/2013 |
| CN | 202914795 | U | 5/2013 |
| CN | 103147718 | A | 6/2013 |
| CN | 203098370 | U | 7/2013 |
| CN | 203257342 | U | 10/2013 |
| CN | 203604686 | U | 5/2014 |
| CN | 204040978 | U | 12/2014 |
| CN | 104329464 | A | 2/2015 |
| CN | 104455529 | A | 3/2015 |
| CN | 104550926 | A | 4/2015 |
| CN | 204253915 | U | 4/2015 |
| CN | 204738957 | U | 11/2015 |
| CN | 204805591 | U | 11/2015 |
| CN | 205136660 | U | 4/2016 |
| CN | 205315253 | U | 6/2016 |
| CN | 106151558 | A | 11/2016 |
| CN | 205841808 | U | 12/2016 |
| CN | 106481831 | A | 3/2017 |
| CN | 206386512 | U | 8/2017 |
| CN | 206530720 | U | 9/2017 |
| CN | 206845939 | U | 1/2018 |
| CN | 107795698 | A | 3/2018 |
| CN | 108329035 | A | 7/2018 |
| CN | 208364190 | U | 1/2019 |
| CN | 208416485 | U | 1/2019 |
| CN | 208416492 | U | 1/2019 |
| CN | 109321864 | A | 2/2019 |
| CN | 109458326 | A | 3/2019 |
| CN | 109695727 | A | 4/2019 |
| CN | 209261799 | U | 8/2019 |
| CN | 209370028 | U | 9/2019 |
| CN | 110374522 | A | 10/2019 |
| CN | 209469613 | U | 10/2019 |
| CN | 110454586 | A | 11/2019 |
| CN | 209725279 | U | 12/2019 |
| CN | 209866424 | U | 12/2019 |
| CN | 111005695 | A | 4/2020 |
| CN | 111073186 | A | 4/2020 |
| CN | 111455306 | A | 7/2020 |
| CN | 111664087 | A | 9/2020 |
| CN | 111690923 | A | 9/2020 |
| CN | 211649111 | U | 10/2020 |
| CN | 212080181 | U | 12/2020 |
| CN | 212249951 | U | 12/2020 |
| CN | 212718129 | U | 3/2021 |
| CN | 102410194 | X | 4/2021 |
| CN | 213236168 | U | 5/2021 |
| CN | 113634953 | A | 11/2021 |
| CN | 215172271 | U | 12/2021 |
| CN | 215334442 | U | 12/2021 |
| CN | 114196903 | A | 3/2022 |
| CN | 218523056 | U | 2/2023 |
| CN | 220082168 | U | 11/2023 |
| CN | 220320353 | U | 1/2024 |
| CN | 223434777 | U | 10/2025 |
| CN | 223459920 | U | 10/2025 |
| DE | 3126421 | | 1/1983 |
| DE | 112008000977 | T5 | 2/2010 |
| DE | 102009001560 | A1 | 9/2010 |
| DE | 202012104058 | U1 | 3/2014 |
| DE | 102019123225 | A1 | 3/2020 |
| EP | 0 414 955 | | 3/1991 |
| EP | 0520567 | A1 | 12/1992 |
| EP | 3336356 | A1 | 6/2018 |
| EP | 3696408 | A1 | 8/2020 |
| GB | 387341 | A | 1/1933 |
| GB | 2123100 | | 1/1986 |
| GB | 2240592 | | 8/1991 |
| IN | 79MA2001 | A | 9/2007 |
| JP | H08291376 | A | 11/1996 |
| JP | 4019476 | B2 | 12/2007 |
| JP | 2021025560 | A | 2/2021 |
| WO | 2015/077001 | | 5/2015 |
| WO | 2016/024939 | | 2/2016 |
| WO | 2016/045768 | | 3/2016 |
| WO | 2019/169312 | | 9/2019 |
| WO | 2020/180716 | | 9/2020 |
| WO | 2021195572 | | 9/2021 |
| WO | 2022167341 | A1 | 8/2022 |
| WO | 2024026432 | | 2/2024 |
| WO | 2024076786 | A1 | 4/2024 |
| WO | 2024/119019 | | 6/2024 |

OTHER PUBLICATIONS

Michael Agnes, Editor, Webster's New World College Dictionary, Fourth Edition, 1999, 5 pages.

Weir SPM Oil & Gas, Grooveless Fluid End, 2008, 1 page.

Weir SPM Oil & Gas, Weir SPM General Catalog, 2009, 40 pages.

Weir SPM Oil & Gas, Well Service Pump Reference Guide, 2008, 55 pages.

*Intellectual Ventures I LLC* v *VMWare, Inc.*, Case No. 1:19-CV-01075-ADA, Document 91 (W.D. Tex Jun. 3, 2020), Defendant VMWare, Inc's Stipulation of Invalidity Contentions for U.S. Pat. No. 7,949,752, Jun. 3, 2020, 5 pages.

*Vulcan Industrial Holding, LLC et al.* v. *Kerr Machine Co.* Case No. 4:21-cv-433, Document 1, Complaint for Declaratory Judgment of Patent Non-Infringement, Feb. 9, 2021, 17 pages.

*Trilogy Enterprises, Inc.*, v. *Trilogy Education Services, LLC*, Case. No. 6: 19-cv-199-ADA-JCM, Document 35, Fifth Amended Scheduling Order, Sep. 8, 2020, 4 pages.

*Dr. Corneliu Bolbocean* v *Baylor University*, Case No. 6:19-CV-00465-ADA-JCM, Document 34, Scheduling Order, Apr. 6, 2020, 4 pages.

*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.

*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.

*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.

*Kerr Machine Co.*, v *Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.

*Kerr Machine Co.*, v *Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.

*Kerr Machine Co.*, v *Vulcan Industrial Holdings, LLC*, Case. No. 6:20-CV-00200-ADA, Affidavit of Service, Apr. 7, 2020, 1 page.

*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.

*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.

*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.

*Kerr Machine Co.*, v *Vulcan Industrial Holdings, LLC*, Case No. 6:20-CV-00200-ADA, Plaintiff's Preliminary Infringement Contentions, May 22, 2020, 50 pages.

*Kerr Machine Co.*, v *Vulcan Industrial Holdings, LLC, Vulcan Energy Services, LLC, and Cizion, LLC d/b/a/ Vulcan Industrial*

(56) References Cited

OTHER PUBLICATIONS

*Manufacturing*, Case No. 6:20-CV-00200-ADA, Defendants' Preliminary Invalidity Contentions, Aug. 13, 2020, 29 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co.*, v *Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co.*, v *Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et. al.*, v *Kuiper Dairy, LLC, et al.*, Case No. 6:20-CV-00250-ADA-JCM, Document 20, Scheduling Order, Jul. 22, 2020, 4 pages.
*Acquanlan Deonshay Harris* v. *Cenlar, FSB*, Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken, Individually and as Next Friend of A.M.B.*, v *Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.*, Case No. 6:20-CV-00356-ADA-JCM, Document 12, Scheduling Order, Jul. 28, 2020, 4 pages.
*Tipton International, Inc.*, v. *Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc.*, v. *Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.*, v. *3Shape Trios A/S and 3Shape A/S*, Case No. WA:19-CV-00680-ADA, Document 27, Scheduling Order, Apr. 8, 2020, 4 pages.
*Kerr Machine Co.* vs. *Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale Niti Compression Pillars", Scripta Materialia 59(12), 7-10, 2008.
Naghipour et al., "Fatigue Analysis of Notched Laminates: a Time-Efficient Macro-Mechanical Approach", Ohio Aerospace Institute, Cleveland, 2016.
International Search Report and Written Opinion for international application No. PCT/US2023/066143, mailed Aug. 28, 2023.
International Search Report and Written Opinion for international application No. PCT/US2023/073458, mailed Feb. 1, 2024.
U.S. Appl. No. 16/814,267, 194 pages, filed Mar. 10, 2020.
U.S. Appl. No. 17/120,121, 110 pages, filed Dec. 12, 2020.
U.S. Appl. No. 62/234,483, 45 pages, filed Sep. 29, 2015.
U.S. Appl. No. 62/315,343, 41 pages, filed Mar. 30, 2016.
U.S. Appl. No. 62/318,542, 44 pages, filed Apr. 5, 2016.
U.S. Appl. No. 62/346,915, 41 pages, filed Jun. 7, 2016.
U.S. Appl. No. 62/379,462, 24 pages, filed Aug. 25, 2016.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages, 2021.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling," Dec 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages, 2008.
Kerr Pumps, Kerr KD-1250B/KD-1250BCB Plunger Pump Service Manual, 38 pages, 2017.
Kerr Pumps, Kerr KJ-2250B and KJ-2250BCB Plunger Pump Service Manual, 38 pages, 2008.
Kerr Pumps, Kerr KM-3250B / KM-3250BCB Plunger Pump Service Manual, 35 pages, 2008.
Kerr Pumps, Kerr KP-3300B / KP-3300BCB Plunger Pump Service Manual, 41 pages, 2008.
Kerr Pumps, Kerr KT-3350B/BCB KT-3400BCB Plunger Pump Service Manual, 46 pages, 2008.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the

(56) References Cited

OTHER PUBLICATIONS

Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages, 2020.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page, 2016.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages, 2013.
Gardner Denver Pumps, Redline Series Brochure, 3 pages, 2021.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlalQobChMlg47o482q6wlVilTICh2XPA-qEAAYASAAEgKrxPD_BwE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
KerrPumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc, "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages. https://www.diwmsi.com/pumping/qi-1000/, 2000.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages, Sep. 11, 2020.
Claim Chart for U.S. Pat. No. 7,186,097, 22 pages, Sep. 11, 2020.
Claim Chart for U.S. Pat. No. 7,845,413, 8 pages, Sep. 11, 2020.
Claim Chart for U.S. Pat. No. 9,534,472, 8 pages, Sep. 11, 2020.
Claim Chart for U.S. Pat. Pub. No. 2013/0319220, 17 pages, Sep. 11, 2020.
Claim Chart for U.S. Pat. Pub. No. 2014/0348677, 10 pages, Sep. 11, 2020.
Claim Chart for U.S. Pat. Pub. No. 2015/0132157, 23 pages, Sep. 11, 2020.
Claim Chart for "GD-3000," 9 pages, Sep. 11, 2020.
Claim Chart for "NOV-267Q," 14 pages, Sep. 11, 2020.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.

(56) References Cited

OTHER PUBLICATIONS

Collins English Dictionary, “sleeve,” “therethrough,” “through,” “tube,” and “tubular,” 8 pages, 2017.
Collins English Dictionary, “space,” https://www.collinsdictionary.com/us/dictionary/english/space, 2021, 13 pages.
Collins English Dictionary, “stairstep,” https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
“Declaration of Steven M. Tipton, Ph.D., P.E., Submitted with Patent Owner’s Preliminary Response,” Sep. 11, 2020, 155 pages.
“Declaration of William D. Marscher, P.E.—U.S. Pat. No. 10,914,171,” Feb. 11, 2021, 308 pages.
“Declaration of William D. Marscher, P.E.—U.S. Pat. No. 10,591,070,” May 25, 2020, 209 pages.
Email dated Sep. 22, 2020 in PGR2020-00065, 3 pages.
Email dated Sep. 25, 2020 in *Kerr Machine* v *Vulcan Industrial Holdings*, 1 page.
U.S. Pat. No. 10,288,178, 353 pages, Sep. 29, 2016.
U.S. Pat. No. 10,519,950, 142 pages, Aug. 24, 2017.
U.S. Pat. No. 10,591,070, 168 pages, Sep. 18, 2019.
U.S. Appl. No. 16/722,139, 104 pages, filed Dec. 20, 2019.
U.S. Appl. No. 13/773,271, 250 pages, filed Feb. 21, 2013.
U.S. Appl. No. 15/719,124, 183 pages, filed Sep. 28, 2017.
DiaCom Corporation, “Diaphragm Design Guidebook”, 28 pages, 2018.
International Search Report and Written Opinion for international application No. PCT/US2025/059804, mailed Mar. 11, 2026.
Vulcan, High-Impact Replacement Parts, Fortified Valves and Seats, found at: https://www.vulcanindustrial.com/energy-products/replacement-parts, 2021.

* cited by examiner

SYSTEMS, ASSEMBLIES, APPARATUSES, AND METHODS PROVIDING ENHANCED SEAL BETWEEN MACHINE COMPONENTS

CROSS REFERENCE TO RELATED APPLICATIONS

This application claims priority to, and the benefit of U.S. Provisional Application No. 63/852,220, filed Jul. 28, 2025, titled "SYSTEMS, ASSEMBLIES, APPARATUSES, AND METHODS PROVIDING ENHANCED FLUID SEAL BETWEEN MACHINE COMPONENTS," and U.S. Provisional Application No. 63/720,038, filed Nov. 13, 2024, titled "SYSTEMS, ASSEMBLIES, APPARATUSES, AND METHODS PROVIDING ENHANCED FLUID SEAL BETWEEN MACHINE COMPONENTS," the disclosures of which are incorporated herein by reference in their entirety.

TECHNICAL FIELD

The present disclosure relates to systems, assemblies, apparatuses, and methods providing an enhanced seal between machine components and, more particularly, to systems, assemblies, apparatuses, and methods providing an enhanced seal between components in high-power machines.

BACKGROUND

High-power machines often include seals to provide a seal between two or more components of the machine. In some instances, such machine components may include a relatively stationary component and a dynamic component that moves, linearly and/or rotationally, relative to the stationary component. For example, the stationary component may include a housing, cylinder, sleeve, or liner, and the dynamic component may include a rod, piston, or plunger. The seals of high-power machines having such components may often be subjected to increased levels of wear, resulting in frequent maintenance or replacement of the seals.

For example, high-power pumps may be used to transfer a fluid having a first pressure from one location to another location at a second pressure greater than the first pressure. Some types of pumps may be subject to fluctuating interior pressure and elevated temperatures during operation. For example, components of a reciprocating pump may be exposed to fluctuating pressures and elevated temperatures during operation, for example, as plungers reciprocate within a fluid end of the pump.

Pumps may often include a number of seals to prevent fluid from passing from one portion of the pump to another, or from the interior of the pump to the exterior of the pump. An example of such a seal may be used to provide a fluid seal between mating components of the pump. For example, some types of pumps may include various ports that receive another component, and it may be important to provide a fluid seal between the port and the other component. For example, in a reciprocating pump, one or more seals may be provided between a plunger of the pump and a fluid end in which the plunger reciprocates. Some types of pumps, as noted above, may experience relatively large fluctuations in pressure and elevated temperatures, for example, during reciprocation of the plungers. Applicant has recognized that this may result in causing seals in the fluid end to degrade relatively more quickly. The degradation may be particularly pronounced, depending on the contents of the fluid. For example, abrasive particles and/or corrosive fluids may accelerate the degradation of the seals, potentially leading to shortened service lives of the seals, as well as increased downtime, reducing the efficiency of operations using the pump.

An example of a high-power pump includes a pump that may be used to pump fracturing fluid at high pressures and high flow rates during a hydraulic fracturing operation. For example, a hydraulic fracturing operation involves pumping a fracturing fluid at high flow rates and high pressures sufficient to fracture a reservoir formation to allow hydrocarbons to more easily flow from the formation toward a wellbore for production. Such high rates of flow and high pressures may result in significant wear to components associated with the fluid flow, such as high-power pumps used to pump the fracturing fluid. In addition, the fracturing fluid may contain substances, for example, proppants and fluids having abrasive and corrosive characteristics, and thus, seals and components associated with operation of the pumps may exhibit relatively higher wear rates or failure rates. As a result, components associated with pumps, such as seals, may require relatively more frequent maintenance, repair, or replacement, which may increase downtime for the hydraulic fracturing operation and reduce efficiency and productivity. For example, the seals and related components may degrade with use in such harsh conditions, as described above, creating leakage at the seals and related components, which reduces the efficiency and capabilities of the pump.

For at least these reasons, Applicant has recognized that it may be desirable to provide seals, related assemblies, and related methods resulting in relatively longer service lives that reduce downtime associated with use in high-power machines, such as high-power pumps. At least some examples described herein may address one or more of the above-noted potential issues, as well as possibly others.

SUMMARY

As referenced above, it may be desirable to provide seals, related assemblies, and related methods that result in relatively longer service lives that reduce downtime associated with use in a high-power machine, such as, for example, seals and components used in the oil and gas industry, where the operating conditions and fluids may present a particularly harsh environment. In some embodiments, the systems, assemblies, apparatuses, and methods presented herein may provide a relatively enhanced seal between machine components, such as seals and adjacent components, which may result in relatively reduced damage, deformation, wear, and/or leakage during operation of high-power machines, such as high-power pumps including the seals and components. For example, in some embodiments, the seals and associated components may be configured to reduce or prevent damage, deformation, wear, and/or leakage of the seals and associated components during operation of a high-power pump.

According to some embodiments, a fluid end may include a fluid end block at least partially defining a fluid end bore and a packing recess associated with the fluid end bore. The packing recess may at least partially define a packing recess bore. The fluid end further may include a packing assembly at least partially received in the packing recess bore. The packing assembly may be positioned to enhance a seal between the packing recess and a plunger reciprocating relative to the fluid end block. The packing assembly may include a packing assembly seal having a seal body including a seal body surface and a seal cross-section at least partially defined by the seal body surface. The seal body may include a first portion including a first material, the first material having a first coefficient of friction. The seal body further may include a second portion including a second material, the second material having a second coefficient of friction less than the first coefficient of friction, thereby to reduce friction at a seal interface between the packing assembly seal and the plunger, so as to reduce heat generation and extend a service life of the packing assembly seal as the plunger moves relative to the packing recess. The packing assembly further may include one or more of a lantern ring, a lube seal, an adaptor ring, a pressure ring, or a junk ring.

According to some embodiments, a packing assembly to enhance a seal between a surface of a first component of a fluid end and a surface of a second component of the fluid end may include a packing assembly seal having a seal body including a seal body surface and a seal cross-section at least partially defined by the seal body surface. The packing assembly seal may include one of a header ring, a pressure ring, or a scraper ring, and the seal body may have a first portion including a first material, the first material having a first coefficient of friction. The seal body further may have a second portion including a second material, the second material having a second coefficient of friction less than the first coefficient of friction, thereby to reduce friction at a seal interface between the packing assembly seal and the second component, so as to reduce heat generation and extend a service life of the packing assembly seal as the second component moves relative to the first component. The first component may include a stationary component relative to the second component during operation of the fluid end, and the second component may include one of a reciprocating component or a rotating component relative to the first component during operation of the fluid end. The packing assembly further may include one or more of a lantern ring, a lube seal, an adaptor ring, a pressure ring, or a junk ring.

According to some embodiments, a packing assembly seal to enhance a seal between a surface of a first component of a fluid end and a surface of a second component of the fluid end may include a seal body having a seal body surface and a seal cross-section at least partially defined by the seal body surface. The seal body may include a first portion including a first material, the first material having a first coefficient of friction. The seal body further may include a second portion including a second material, the second material having a second coefficient of friction less than the first coefficient of friction, thereby to reduce friction at a seal interface between the packing assembly seal and the second component, so as to reduce heat generation and extend a service life of the packing assembly seal as the second component moves relative to the first component. The first component may include a stationary component relative to the second component during operation of the fluid end, and the second component may include one of a reciprocating component or a rotating component relative to the first component during operation of the fluid end.

According to some embodiments, a method for enhancing a seal between a surface of a first component of a fluid end and a surface of a second component of the fluid end may include positioning a seal between the surface of the first component and the surface of the second component. The seal may have a seal body including a seal body surface and a seal cross-section at least partially defined by the seal body surface. The seal body may include a first portion including a first material, the first material having a first coefficient of friction. The seal body further may include a second portion including a second material, the second material having a second coefficient of friction less than the first coefficient of friction, thereby to reduce friction at a seal interface between the seal and the second component. The method further may include suppressing generation of heat associated with the seal between the first component and the second component, via the second portion of the seal, during operation of the fluid end as the second component moves relative to the first component.

According to some embodiments, a seal may be provided to enhance a seal between the surface of a first component and the surface of a second component that moves relative to the first component during operation of the machine. The seal may include a seal body having a seal body surface and a seal cross-section at least partially defined by the seal body surface. The seal body may include a first portion and an associated second portion having different coefficients of friction, with the second portion being positioned to provide a seal interface between the first and second components. The coefficient of friction of the second portion may be less than the coefficient of friction of the first portion, thereby to reduce friction at the seal interface between the seal and the second component, so as to reduce heat generation and extend the service life of the seal as the second component moves relative to the first component.

According to some embodiments, a seal to enhance a seal between a surface of a first component of a machine and a surface of a second component of the machine, may include a seal body having a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the seal and the second component, so as to reduce heat generation and extend a service life of the seal as the second component moves relative to the first component. The first component may include a stationary component relative to the second component during operation of the machine, and the second component may include a reciprocating component and/or a rotating component relative to the first component during operation of the machine.

According to some embodiments, a packing assembly to enhance a seal between a surface of a first component of a machine and a surface of a second component of the machine, may include a packing assembly seal having a seal body including a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the packing assembly seal and the second component, so as to reduce heat generation and extend a service life of the packing assembly seal as the second component moves relative to the first component. The first component may include a stationary component relative to the second component during operation of the machine, and the second component may include a reciprocating component and/or a rotating component relative to the first component during operation of the machine. The packing assembly further may include one or more of: (a) a lantern ring; (b) a lube seal; (c) an adaptor ring; (d) a pressure ring; or (e) a junk ring.

According to some embodiments, a packing assembly to enhance a seal between a surface of a first component of a pump and a surface of a second component of the pump, may include a header ring having a seal body including a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the packing assembly seal and the second component, so as to reduce heat generation and extend a service life of the packing assembly seal as the second component moves relative to the first component. The first component may include a stationary component relative to the second component during operation of the machine, and the second component may include a reciprocating component and/or a rotating component relative to the first component during operation of the machine. The packing assembly further may include one or more of: (a) a lantern ring; (b) a lube seal; (c) an adaptor ring; (d) a pressure ring; or (e) a junk ring.

According to some embodiments, a fluid end may include a fluid end block at least partially defining a fluid end bore, a packing recess associated with the fluid end bore, the packing recess at least partially defining a packing recess bore, and a packing assembly at least partially received in the packing recess bore. The packing assembly may be positioned to enhance a seal between the packing recess and a plunger reciprocating relative to the fluid end block. The packing assembly may include a packing assembly seal having a seal body including a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the packing assembly seal and the plunger, so as to reduce heat generation and extend a service life of the packing assembly seal as the plunger moves relative to the packing recess. The packing assembly further may include one or more of: (a) a lantern ring; (b) a lube seal; (c) an adaptor ring; (d) a pressure ring; or (e) a junk ring.

According to some embodiments, a pump may include a fluid end as described herein, and a power end including a plunger positioned to reciprocate relative to the fluid end.

According to some embodiments, a method for enhancing a seal between a surface of a first component of a machine and a surface of a second component of the machine, may include positioning a seal between the surface of the first component and the surface of the second component, the seal having a seal body having a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the seal and the second component. The method further may include suppressing generation of heat associated with the seal between a first component and a second component.

According to some embodiments, a method for increasing a service life of a seal for providing a seal between a surface of a first component of a machine and a surface of a second component of the machine, may include positioning a seal between the surface of the first component and the surface of the second component. The seal may have a seal body including a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the seal and the second component. The method further may include suppressing generation of heat associated with the seal between a first component and a second component.

According to some embodiments, a method for enhancing a seal between a surface of a first component of a pump and a surface of a second component of the pump, may include positioning between the surface of the first component of the pump and the surface of the second component of the pump, a seal having a seal body including a seal body surface and a seal cross-section at least partially defined by the seal body surface. The seal body may include a first portion including a first material, the first material having a first coefficient of friction, and a second portion including a second material, the second material having a second coefficient of friction less than the first coefficient of friction, thereby to reduce friction at a seal interface between the seal and the second component of the pump, so as to reduce heat generation and extend a service life of the seal as the second component of the pump moves relative to the first component.

Still other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
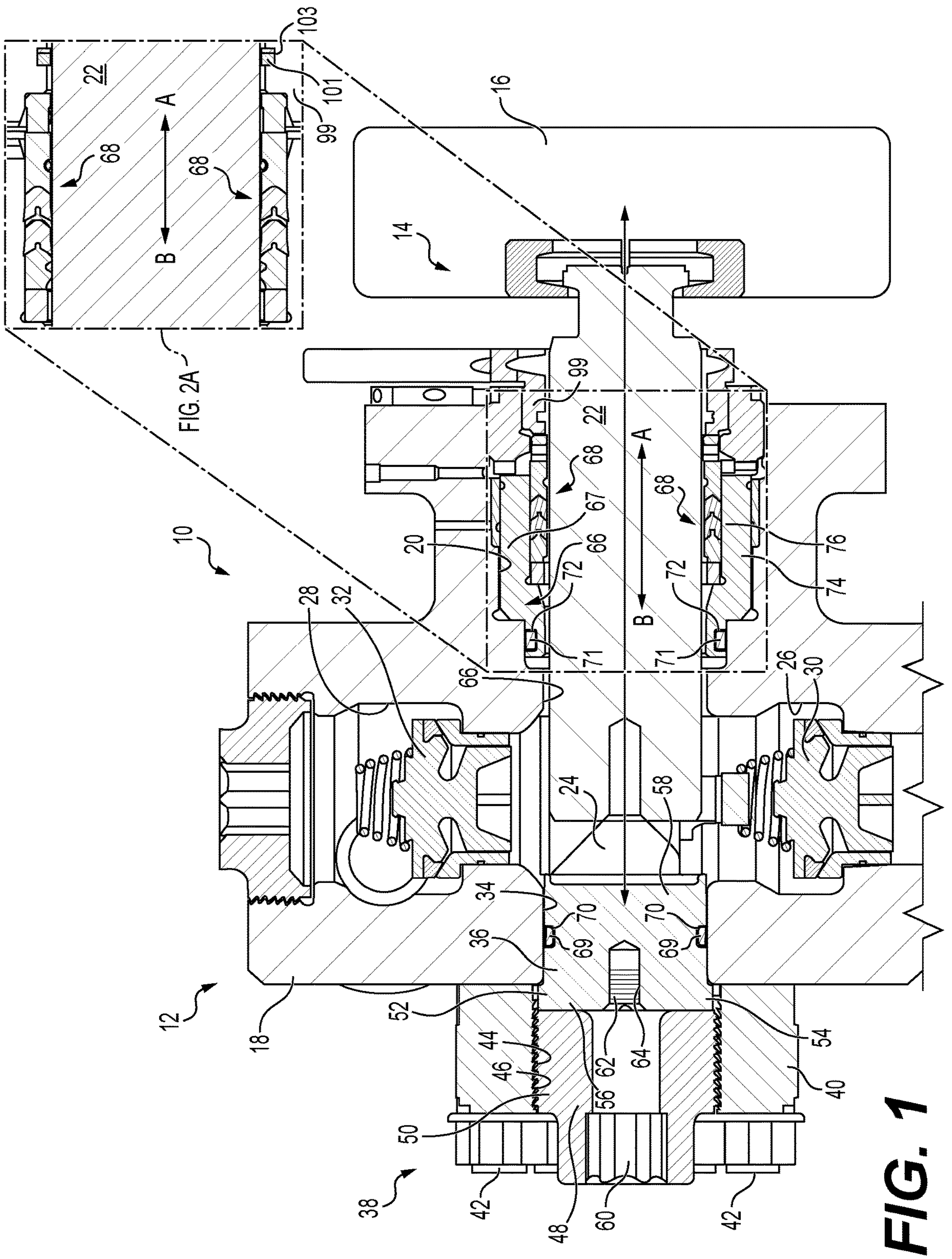
FIG. 1 is a schematic side section view of an example high-power machine, including a high-power pump having a fluid end including example seals between example components of the high-power pump, according to embodiments of the disclosure.

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

The present disclosure generally is directed to systems, assemblies, apparatuses, and methods that may provide a relatively enhanced seal (e.g., an enhanced fluid seal) between machine components, such as seals and adjacent components, which may result in relatively reduced damage, deformation, wear, and/or leakage during operation of high-power machines, including the seals and components. For example, in some embodiments, the seals and associated components may be configured to reduce or prevent damage, deformation, wear, and/or leakage of the seals and associated components during operation of a high-power pump. Although examples described herein are explained to relation to example high-power pumps and related assemblies and methods, other types of machines are contemplated, such as other high-power machines. For example, embodiments of the systems, assemblies, apparatuses, and methods may be used in other machines, such as, for example, a mud pump, a cement pump, a severe-duty hydraulic cylinder, mining equipment, and/or downhole extensible tooling (e.g., drilling jars, bumper subs, etc.) that are packed for high-pressure, high-cycle applications.

For example, in some embodiments, the seal may have a seal body including one or more portions including different materials, at least one of which materials has a different coefficient of friction as compared to another one of the different materials. As used herein, "coefficient of friction" may refer to static coefficient of friction and/or kinetic coefficient of friction. For example, in some embodiments, a second portion of the seal may have a coefficient of friction less than the coefficient of friction of a first portion of the seal, and a seal interface between the seal and one of the machine components may be provided by the second portion of the seal, thereby to reduce friction at the seal interface between the seal and the one of the machine components, so as to reduce heat generation and extend a service life of the seal as the one of the components moves relative to another of the machine components. For example, a first component may include a stationary component relative to a second component during operation of the machine, and the second component may include a reciprocating and/or rotating component relative to the first component during operation of the machine. For example, during operation of a pump, a reciprocating motion between a plunger and a seal, such as, for example, a packing assembly seal, may result in generation of heat, causing the temperature of the packing assembly seal to increase. In some instances, the increase in temperature may lead to degradation of the packing assembly seal. Applicant has recognized, surprisingly, that by including a portion of the packing assembly seal that forms the seal interface with a moving component having a reduced coefficient of friction, friction at the seal interface between the packing assembly seal and the moving component may be reduced, thereby reducing heat generation at the seal interface, so as to reduce the rate of degradation of the packing assembly seal and extend the useful life of the packing assembly seal. Other types of seals are contemplated.

In some embodiments, the second portion of the seal, which includes the material having a relatively reduced friction, may be formed of a material that deposits a friction-reducing layer of material onto the surface of the moving component, for example, as it reciprocates and/or rotates within the packing assembly, thereby reducing friction and heat generation at the seal interface. For example, the second portion may transfer material to the surface, creating a relatively low friction dynamic surface, thereby effectively reducing friction and heat generation between, for example, some (or all) of the seal rings of the packing assembly and the moving component. For example, as a pump plunger reciprocates, the second portion of the seal, having reduced friction, transfers the material (e.g., such as polytetrafluoroethylene (PTFE)) onto the surface of the plunger (e.g., into to the micro/macro surface imperfections of the plunger), thereby creating a solid lubrication film that reduces the friction between the reciprocating plunger and other rings of the packing assembly, such as, for example, the pressure rings and any grease seals. This reduction of friction reduces the heat generated by the plunger/seal interface, thereby reducing a significant contributor to packing assembly wear and/or failure.

FIG. 1 is a schematic partial side section view of an example machine, an example pump 10, including an example fluid end assembly 12 and an example power end assembly 14, according to embodiments of the disclosure. In some embodiments, the pump 10 may be, for example, a hydraulic fracturing pump for pumping hydraulic fracturing fluid. Although embodiments of the pump 10 are described herein as being a "hydraulic fracturing pump" for pumping hydraulic fracturing fluid for the purpose of discussion, the pump 10 may be any other type of pump, such as, for example, any type of high-power pump, high-pressure pump, reciprocating pump, and/or high-flow rate pump suitable for pumping solids, semi-solids, slurries, liquids, fluids, or combinations thereof. In some embodiments, the pump 10 may be, for example, a hydraulic fracturing pump for pumping solids, semi-solids, slurries, liquids, fluids, or combinations thereof, such as hydraulic fracturing fluid.

For example, a reciprocating plunger pump may be used to pump a fracturing fluid at high flow rates and high pressures sufficient to fracture a reservoir formation to allow hydrocarbons to more easily flow from the formation toward a wellbore for production. A hydraulic fracturing operation may include as many as six or more hydraulic fracturing units, and each of the hydraulic fracturing units may include a prime mover, such as an electric motor or internal combustion engine, either directly connected, or connected via a transmission, to the reciprocating plunger pump to supply power to drive the reciprocating plunger pump to pump the fracturing fluid into the formation to stimulate production of the well. For example, typical flow rates for a hydraulic fracturing operation may range from about 1,500 to about 4,000 gallons per minute, and typical pressures may range from about 7,500 to about 15,000 pounds per square inch. Although many examples discussed in this disclosure are explained in relation to hydraulic fracturing pumps, such as reciprocating plunger pumps for pumping fracturing fluid and related methods, other flow control-related and/or pumping-related operations, components, and methods are contemplated.

As shown in FIG. 1, the example pump 10 may be a reciprocating plunger pump and may include the fluid end assembly 12 and the power end assembly 14 In some embodiments, the power end assembly 14 may include, for example, a housing 16 with mechanical power transmission components, such as a crankshaft, bearings supporting the crankshaft in the housing, crossheads, reduction gears, and/or connecting rods (e.g., pony rods) and plungers connected to the connecting rods. In some embodiments, the power end assembly 14 may be configured to convert power into reciprocating motion. For example, the power end assembly 14 may be configured to convert rotational power into reciprocating motion, or the power end assembly 14 may be configured to convert electric or hydraulic power into reciprocating motion.

As shown in FIG. 1, the fluid end assembly 12 may include, for example, a fluid end block 18 including one or more fluid end bores 20 (e.g., cylinders) in which respective plungers 22 reciprocate, one or more chambers 24 receiving fluid, one or more suction ports 26 for drawing fluid into the one or more chambers 24, and one or more discharge ports 28 for discharging fluid from the one or more chambers 24 at a higher pressure. For example, as each plunger 22, moved via operation of, for example, a crankshaft and a respective connecting rod of the power end assembly 16, at least partially retracts in direction A into a respective cylinder 20, fluid is drawn into the chamber 24 of the fluid end assembly 12 via the suction port 26 in the fluid end block 18 while a suction valve 30 is open and a discharge valve 32 is closed. As each plunger 22 extends back toward the chamber 24 in direction B, moved via operation of, for example, the crankshaft and the respective connecting rod of the power end assembly 16, pressurized fluid is discharged from the fluid end assembly 12 via the discharge port 28 in the fluid end block 18 while the discharge valve 32 is open and the suction valve 30 is closed. The suction valve 30 and discharge valve 32 may be one-way valves or check valves, allowing fluid to flow only in a single direction, either into the fluid end block 18 via the suction valve 30, or from the fluid end block 18 via the discharge valve 32. In this example manner, the pump 10 draws fluid into the fluid end assembly 12 at a first pressure and discharges the fluid from the fluid end assembly 12 at a higher pressure. In some pump embodiments, the fluid end assembly 12 may include multiple (e.g., two, three, four, or five) sets of suction ports and/or passages, cylinders, plungers, and discharge ports and/or passages to pump fluid at high pressures and/or high flow rates. Other types of pumps, fluid end assemblies, and/or power end assemblies are contemplated.

As shown in FIG. 1, in some embodiments, the fluid end assembly 12 may include an access port 34 providing access to the chamber 24, for example, for use during assembly and/or maintenance of the fluid end assembly 12. The access port 34 may be selectively closed via a cover 36 received in the access port 34. In some embodiments, the access port 34 may be defined in the fluid end block 18 by a circular aperture having an interior face having a substantially cylindrical configuration. In some embodiments, the cover 36 may have a substantially circular cross-section and may have a substantially cylindrical configuration sized and shaped to fit within the interior face of the access port 34, for example, as shown in FIG. 1. In some embodiments, the cover 36 may be sized and shaped to fit snugly within the access port 34.

In some embodiments, a retainer assembly 38 may be used to secure the cover 36 within the access port 34. As shown, in some embodiments, the retainer assembly 38 may include an outer housing 40 configured to be secured to an exterior surface of the fluid end block 18 adjacent the access port 34, for example, via one of more fasteners 42. The outer housing 40 may define a receiver aperture 44 provided with interior retainer threads 46. The retainer assembly 38 further may include a retainer 48, which may include a substantially cylindrical body having exterior retainer threads 50 configured to threadedly engage the interior retainer threads 46 of the outer housing 40. In some embodiments, the cover 36 may include a shoulder 52 and a flange 54 having an exterior end 56 opposite an interior end 58 facing the chamber 24. The shoulder 52 and flange 54 may be configured to abut the exterior surface of the fluid end block 18 adjacent the access port 34. The retainer 48 may be threaded into the outer housing 40 and abut the exterior end 56 of the cover assembly 36, thereby to secure the cover assembly 36 in the access port 34. As shown, in some embodiments, the retainer 48 may include a retainer recess 60 configured to be engaged by a tool for assisting the tightening and loosening of the retainer 48 relative to the outer housing 40 and the cover assembly 36.

As shown in FIG. 1, some embodiments of the cover 36 may include a cover recess 62 opening outward from the center of the exterior end 56 of the cover 36 surface and having interior threads 64. The cover recess 62 may be used to assist within removal of the cover 36, for example, to provide access to the chamber 24. For example, a tool may be used to engage the cover recess 62 (e.g., via the interior threads 64) and assist with pulling the cover 36 from the access port 34.

As shown in FIG. 1, in some embodiments, the fluid end block 18 may include a packing recess 66 in the fluid end bore 20 and at least partially defining a packing recess bore 67. In some embodiments, a packing assembly 68 may be received in the packing recess bore 67 of the packing recess 66, thereby to enhance a fluid seal between the packing recess 66 and a plunger 22 reciprocating relative to the fluid end block 18. The packing recess bore 67 of the packing recess 66 and the packing assembly 68 may be substantially cylindrical, with the packing recess 66 having a substantially circular cross-section and the packing assembly 68 having a substantially cylindrical outer surface received in the packing recess 66. The packing assembly 68 may be configured to at least partially receive therein the plunger 22 as the plunger 22 reciprocates, thereby to draw fluid into the chamber 24 at a first pressure via the suction port 26 during movement of the plunger 22 in the first direction A and discharge the fluid from the chamber 24 at a second pressure greater than the first pressure via the discharge port 28 during movement of the plunger 22 in the second direction B, for example, as shown in FIG. 1. In some embodiments, the packing assembly 68 may be received in the fluid end bore 20, for example, with the fluid end bore 20 being configured to directly receive the packing assembly 68 (e.g., without any intermediate components).

As shown in FIG. 1, a seal 69 (e.g., an annular seal) may be provided between the interior surface of the access port 34 and an exterior surface of the cover 36, thereby to provide a fluid seal between the access port 34 the cover 36 when the cover 36 is received in the access port 34. For example, as shown, the cover 36 may include on the outer cylindrical surface thereof an annular groove 70, and the seal 69 may be at least partially received in the annular groove 70.

As shown in FIG. 1, a seal 71 (e.g., an annular seal) may be provided between the interior surface of the packing recess 66 and an exterior surface of a packing sleeve 74, thereby to provide a fluid seal between the first and second components, for example, the packing recess 66 and the packing sleeve 74, when an end of the packing sleeve 74 is placed in the packing recess 66. For example, as shown, the packing sleeve 74 may include on the outer cylindrical surface thereof an annular groove 72, and the seal 71 may be at least partially received in the annular groove 72.

As shown in FIG. 1, in some embodiments, the packing sleeve 74 may be received in the packing sleeve bore 67 of the fluid end bore 20, and the packing assembly 68 may be received in a packing assembly bore 76 of the packing sleeve 74. The packing assembly 68 may be configured to provide an at least partial fluid seal between the plunger 22 as it reciprocates and the packing sleeve 74, for example, as described herein.

Figure 2A:
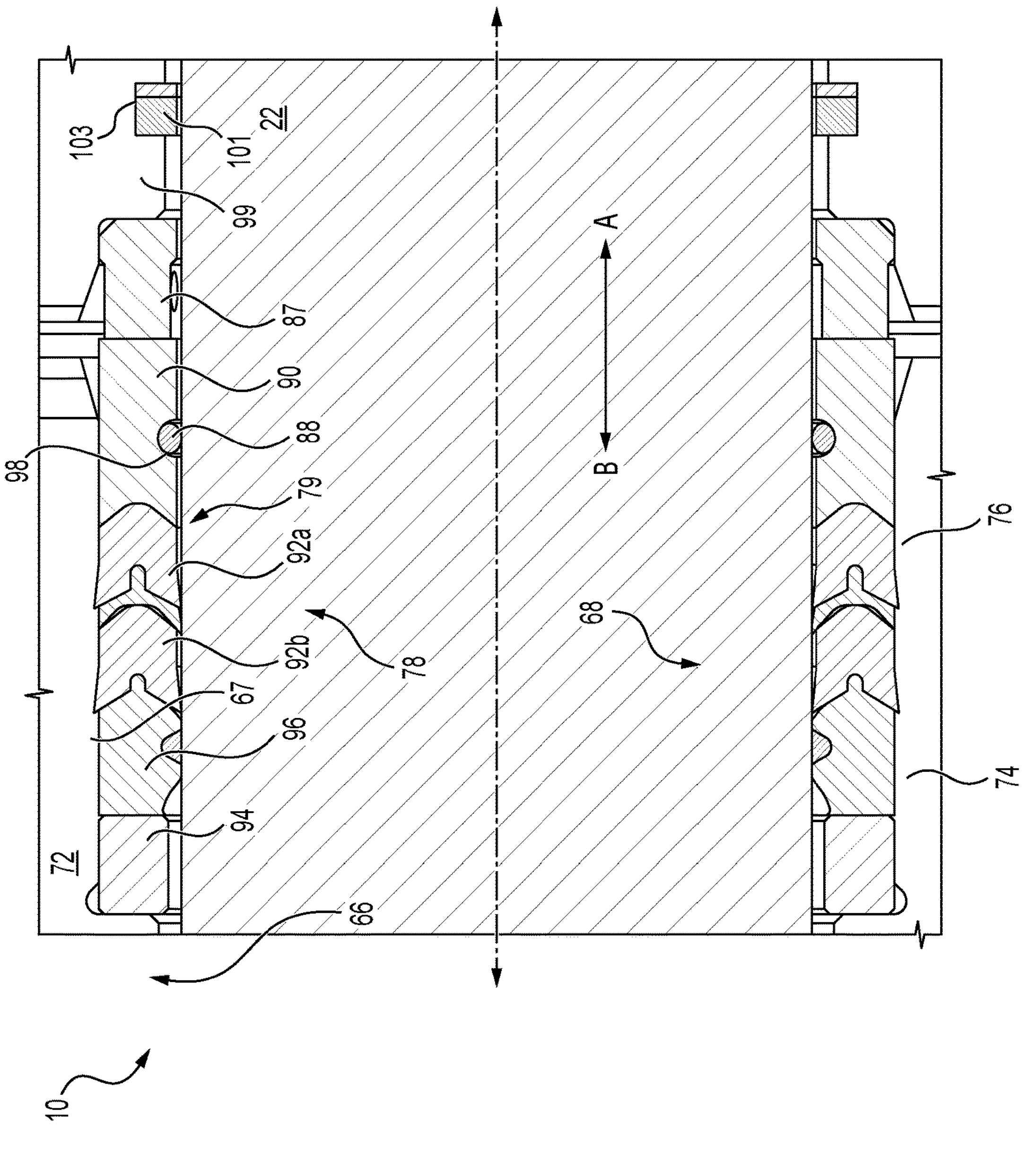
FIG. 2A is a schematic side section view of a portion of the example high-power pump shown in FIG. 1, including an example packing assembly, according to embodiments of the disclosure.
Figure 2B:
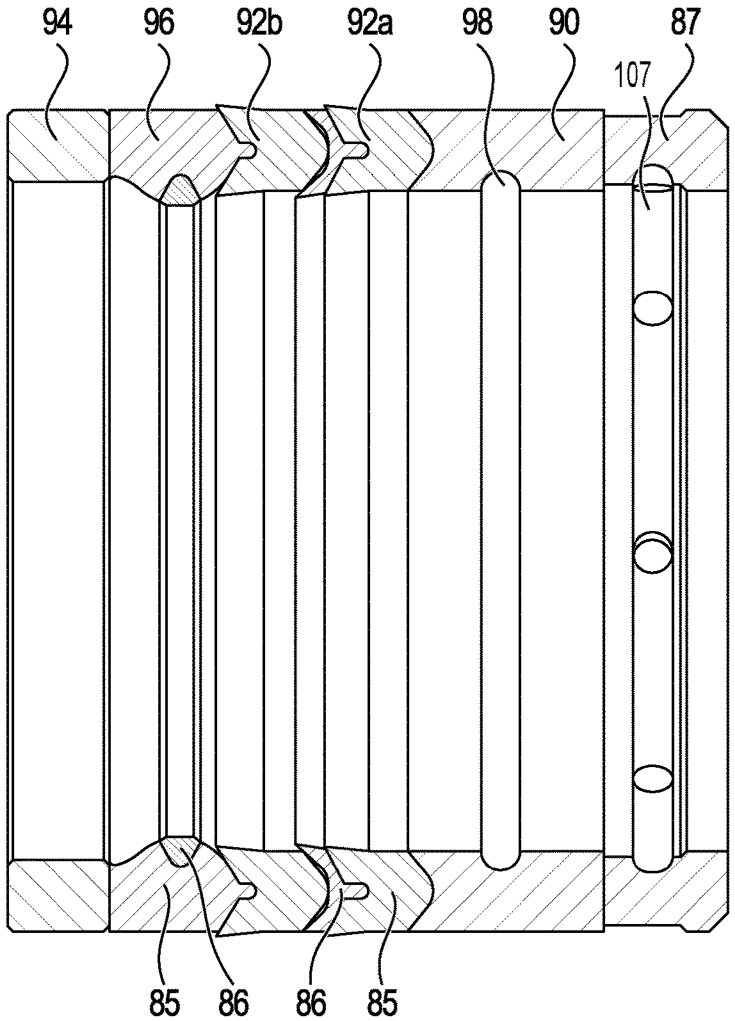
FIG. 2B is a schematic side section view of the example packing assembly shown in FIG. 2A, according to embodiments of the disclosure.
Figure 2C:
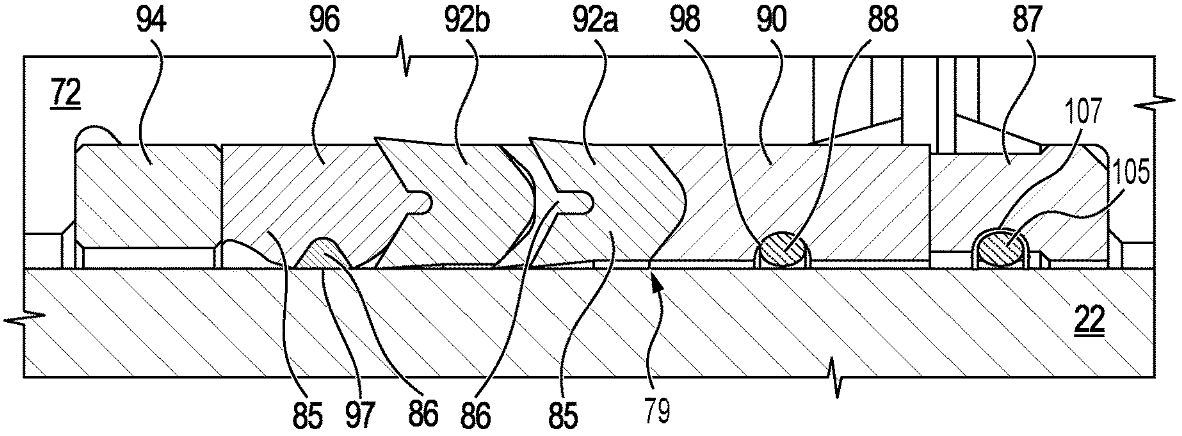
FIG. 2C is a schematic partial side section view of the example packing assembly shown in FIG. 2A, according to embodiments of the disclosure.

FIG. 2A is a schematic side section view of a portion of the example high-power pump 10 shown in FIG. 1, including an example packing assembly 68, according to embodiments of the disclosure. FIG. 2B is a schematic side section view of the example packing assembly 68 shown in FIG. 2A, according to embodiments of the disclosure, and FIG. 2C is a schematic partial side section view of the example packing assembly 68 shown in FIG. 2A, according to embodiments of the disclosure. As shown in FIGS. 2A-2C, in some embodiments, the packing assembly 68 may be configured to enhance a fluid seal between a surface of a first component of a pump and a surface of a second component of the pump. For example, the packing assembly 68 may include one or more packing assembly seals 78 (e.g., a header ring, a scraper ring, and/or one or more pressure rings). The packing assembly seals 78 may include a seal body 80 having a seal body surface 82 and a seal cross-section 84 at least partially defined by the seal body surface 82. In some embodiments, the seal body 80 may include (or be formed into) an annular seal body. In at least some embodiments, the seal body 80 may include a first portion 85 and a second portion 86, with the second portion 86 being positioned and configured to provide a seal interface 79 between the packing assembly seal 78 and a moving component of the machine, for example, the example plunger 22 of the example pump 10.

In some embodiments, the first portion 85 may include (or be formed of) a first material, with the first material having a first coefficient of friction. The second portion 86 may include (or be formed of) a second material, with the second material having a second coefficient of friction less than the first coefficient of friction, thereby to reduce friction at the seal interface 79 between the packing assembly seal 78 and the second component, so as to reduce heat generation and extend the service life of the packing assembly seal 78 and/or the packing assembly 68, as the second component moves relative to the first component, for example as described herein.

In some embodiments, the packing assembly 68 further may include (a) a lantern ring 87, (b) a lube seal 88, (c) an adaptor ring 90, (d) one or more pressure rings 92 (92*a* and 92*b*), and/or (e) a junk ring 94. In some embodiments, the packing assembly seal 78 may include a header ring (or a scraper ring) 96. In some embodiments, the packing assembly seal 78 may include one or more pressure rings 92. For example, the packing assembly 68 may include one or more pressure rings 92 and a junk ring 94, and the packing assembly seal 78 (e.g., the header ring 96) may be positioned between the one or more pressure rings 92 and the junk ring 94, for example, as shown in FIGS. 2A-2C. In some embodiments, the packing assembly 68 may include a header ring 96 and a junk ring 94, and the packing assembly seal 78 (e.g., one or more pressure rings 92) may be positioned between the header ring 96 and the adaptor ring 90, for example, as shown in FIGS. 2A-2C. Other relative orders are contemplated. In some embodiments, a packing retainer nut 99 may be positioned to retain and/or preload the packing assembly 68 relative to the packing assembly bore 76 of the packing sleeve 74, for example, being positioned adjacent and in contact with the lantern ring 87 and, in some embodiments, pressing against the lantern ring 87 and toward the junk ring 94, thereby axially loading the packing assembly 68. In some embodiments, a lube seal 101 (e.g., at least similar the lube seal 88) may be received in a groove 103 in an inner surface of the packing retainer nut 99.

In some embodiments, the lantern ring 87 may include (or be formed of) one or more metallic materials, such as bronze, aluminum, or brass, and/or other materials having similar characteristics, such as, for example, thermoplastics, polyamides (e.g., high performance engineering plastics, such as polyether ether ketone (PEEK)), and/or synthetic polymer alloys, such as ORKOT™ (an advanced reinforced medium weave polymer), and/or other composite bearing materials. In some embodiments, the lube seal 88 may include (or be formed of) one or more of an O-ring seal, natural rubber, synthetic rubber, polymeric material, nitriles, fluorocarbon resins, or silicone resins. In some embodiments, the adaptor ring 90 may include (or be formed of) one or more metallic materials, such as bronze, aluminum, or brass, and/or other materials having similar characteristics, such as, for example, thermoplastics, polyamides (e.g., high performance engineering plastics, such as polyether ether ketone (PEEK)), and/or synthetic polymer alloys, such as ORKOT™ (an advanced reinforced medium weave polymer), and/or other composite bearing materials.

In some embodiments, the one or more pressure rings 92 may include (or be formed of) one or more of fabric, composite, nitrile rubber (HNBR), polytetrafluoroethylene (PTFE), thermoplastic polyurethane (TPU), or RESILON™. As described herein, in some embodiments, the one or more pressure rings 92 may include a first portion 85 and a second portion 86. In some embodiments, the first portion 85 may include (or be formed of) one or more of fabric, composite, nitrile rubber (HNBR), polytetrafluoroethylene (PTFE), thermoplastic polyurethane (TPU), or RESILON™, and/or the second portion 86 may include (or be formed of) one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, or carbon nanotube-filled UHMW-PE, composite materials having similar functional characteristics, or other materials having similar functional characteristics. In some embodiments, the first portion 85 of the one or more pressure rings 92 may include (or be formed of) a material having a first coefficient of friction, and the first coefficient of friction may range from about 0.11 to about 0.9. Other ranges are contemplated. In some embodiments, the second portion 86 of the one or more pressure rings 92 may be include (or be formed of) a material having a second coefficient of friction, and the second coefficient of friction may range from about 0.01 to about 0.1. Other ranges are contemplated.

In some embodiments, the first coefficient of friction of the first portion 85 may include a first coefficient of static friction and/or a first coefficient of kinetic friction. The second coefficient of friction may include a second coefficient of static friction and/or a second coefficient of kinetic friction. In some embodiments, the second coefficient of static friction and/or the second coefficient of kinetic friction may be less than the first coefficient of static friction and/or the first coefficient of kinetic friction.

In some embodiments, the junk ring 94 may include (or be formed of) one or more one or more metallic materials, such as steel, brass, bronze, or aluminum, composites, and/or other materials having similar characteristics, such as, for example, thermoplastics, polyamides (e.g., high performance engineering plastics, such as polyether ether ketone (PEEK)), and/or synthetic polymer alloys, such as ORKOT™ (an advanced reinforced medium weave polymer), and/or other composite bearing materials. Other materials for one or more of the rings are contemplated.

In some embodiments, the packing assembly seal 78 may include a header ring 96 (and/or a scraper ring), and the packing assembly 68 may include the lantern ring 87, the lube seal 88, the adaptor ring 90, one or more pressure rings 92, and the junk ring 94, for example, as shown in FIGS. 2A-2C. For example, the header ring 96 (and/or a scraper ring) may be positioned between the junk ring 94 and the one or more pressure rings 92, the adaptor ring 90 may be positioned between the one or more pressure rings 92 and the lantern ring 87, and/or a lube seal 105 may be received in a groove 107 of the lantern ring 87 (FIGS. 2A and 2C).

In some embodiments, the header ring 96 may include a first portion 85 and a second portion 86. In some embodiments, the first portion 85 of the header ring 96 may include (or be formed of) a woven metal mesh, a non-woven metal mesh, a metal woven fabric, a metal non-woven fabric, a plurality of layers of metal mesh, a plurality of layers of metal mesh compressed into the seal body 80, a non-woven non-metal mesh, a woven non-metal mesh, a woven non-metal fabric, a non-woven non-metal fabric, polymers, thermoplastic polymers, thermosetting polymers, elastomeric polymers, elastomers, thermoplastics, thermosetting plastics, natural rubber, synthetic rubber, nitrile, butadiene rubber, polyether ether ketone (PEEK), fabric reinforced rubber, aramid reinforced rubber, fiber reinforced rubber, fluorocarbon resins, thermoplastic polyurethane (TPU), thermoplastic copolyester (COPE), ethylene propylene diene monomer (EPDM), highly saturated nitrile rubber (HNBR), thermoplastic polyurethane (TPU), or RESILON™, or polyurethan. In some embodiments, the first portion 85 of the header ring 96 may include (or be formed of) metal mesh, and the metal mesh may include one or more of aluminum, aluminum alloy, brass, brass alloy, bronze, bronze alloy, silver, silver alloy, copper, copper alloy, steel, or steel alloy. In some embodiments, the second portion 86 of the header ring 96 may include (or be formed of) one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, carbon nanotube-filled UHMW-PE, composite materials having similar functional characteristics, or other materials having similar functional characteristics. In some embodiments, the first portion 85 of the header ring 96 (or scraper ring) may include (or be formed of) a material having a first coefficient of friction, and the first coefficient of friction may range from about 0.11 to about 0.9. Other ranges are contemplated. In some embodiments, the second portion 86 of the header ring 96 (or scraper ring) may be include (or be formed of) a material having a second coefficient of friction, and the second coefficient of friction may range from about 0.01 to about 0.1. Other ranges are contemplated.

Figure 3A:
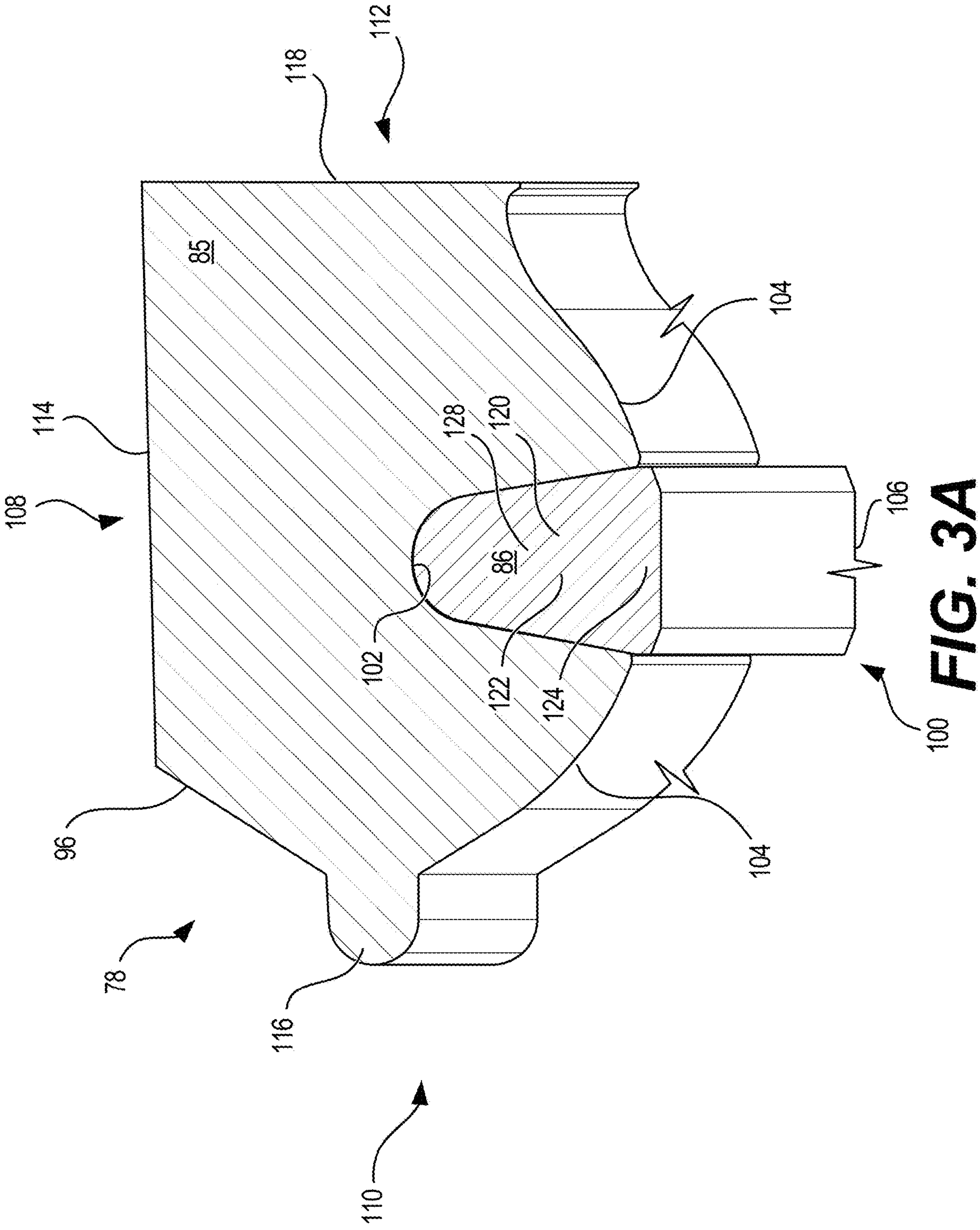
FIG. 3A is a schematic partial cross-sectional view of an example packing assembly seal, including example first and second portions, according to embodiments of the disclosure.
Figure 3C:
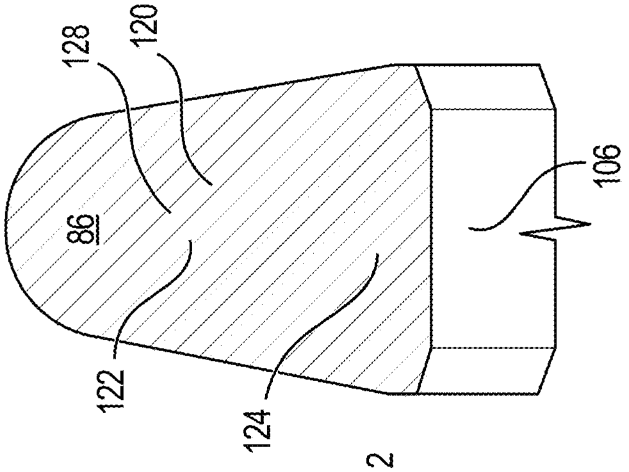
FIG. 3C is a schematic partial cross-sectional view of the example second portion of the example packing assembly seal shown in FIG. 3A, according to embodiments of the disclosure.
Figure 3B:
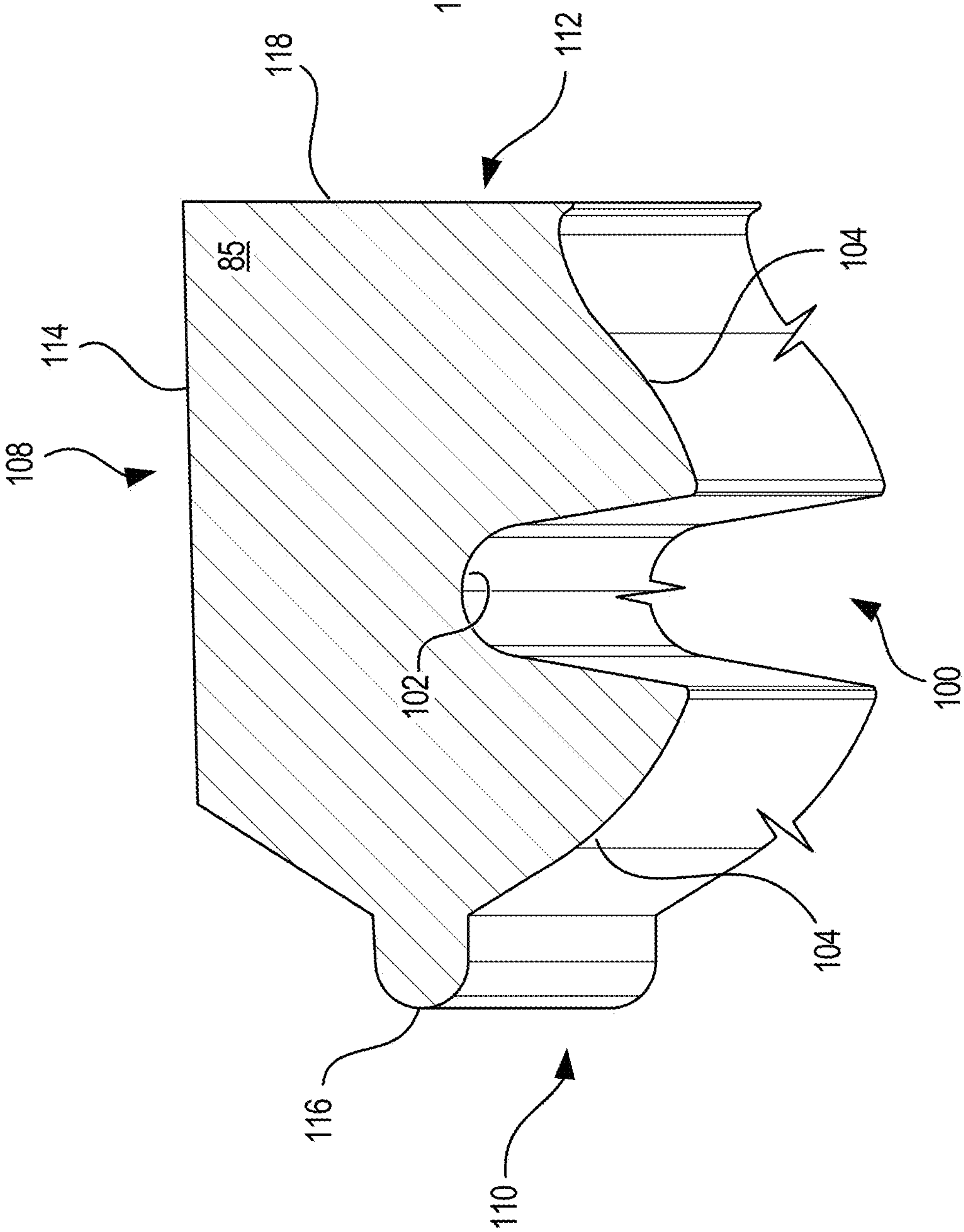
FIG. 3B is a schematic partial cross-sectional view of the example first portion of the example packing assembly seal shown in FIG. 3A, according to embodiments of the disclosure.

FIG. 3A is a schematic partial cross-sectional view of an example packing assembly seal 78 (e.g., a header ring 96), including example first and second portions 85 and 86, according to embodiments of the disclosure. FIG. 3B is a schematic partial cross-sectional view of the example first portion 85 of the example packing assembly seal 78 shown in FIG. 3A, according to embodiments of the disclosure, and FIG. 3C is a schematic partial cross-sectional view of the example second portion 86 of the example packing assembly seal 78 shown in FIG. 3A, according to embodiments of the disclosure. As shown in FIGS. 3A-3C, in some embodiments, the first portion 85 of the packing assembly seal 78 may include an inward facing surface 100 (e.g., a radially inward facing surface), and may at least partially define a recess 102 (e.g., an annular recess) in the inward facing surface 100 of the first portion 85. In some embodiments, the second portion 86 of the packing assembly seal 78 may be at least partially received in the recess 102 in the inward facing surface 100 of the first portion 85. In some embodiments, the inward facing surface 100 of the first portion 85 may be substantially convex and/or may at least partially define a curved surface 104. The second portion 86 may include an inward facing surface 106 (e.g., a radially inward facing surface), and the inward facing surface 106 of the second portion 86 may project inward relative to the curved surface 104 of the inward facing surface 100 of the first portion 85, for example, such that the inward facing surface 106 of the second portion 86 projects radially inward beyond a continuation of the curved surface 104 of the inward facing surface 100 of the first portion 85, for example, as shown. In some embodiments, the second portion 86 may include the inward facing surface 106, and the inward facing surface 106 of the second portion 86 may be positioned at the seal interface 79 between the packing assembly seal 78 and the second component (e.g., a plunger of a pump).

As shown in FIGS. 3A-3C, in some embodiments, the seal cross-section 84 may include the inward facing surface 100 at least partially defined by the second portion 86, and an outward facing surface 108 (e.g., a radially outward facing surface) substantially opposite the inward facing surface 106. The outward facing surface 108 may be at least partially defined by the first portion 85. The seal cross-section 84 may further include a first axial end surface 110 at least partially defined by the first portion 85, and a second axial end surface 112 substantially opposite the first axial end surface 110. The second axial end surface 112 may be at least partially defined by the first portion 85. In some embodiments, as shown in FIGS. 3A-3C, for example, the inward facing surface 100 may include a substantially convex portion at least partially defined by the first portion 85, and the outward facing surface 108 may include a substantially planar portion 114 at least partially defined by the first portion 85. In some embodiments, the first axial end surface 110 may at least partially define a protrusion 116 at least partially defined by the first portion 85, and/or the second axial end surface 112 may at least partially define a substantially planar portion 118 at least partially defined by the first portion 85.

In some embodiments, the first portion 85 and the second portion 86 may be molded together to form a single-piece integrated seal body 80 (e.g., a single-piece integrated annular seal body). In some embodiments, the first portion 85 and the second portion 86 may be co-extruded and formed into the seal body 80. In some embodiments, the first portion 85 and the second portion 86 may be formed separately and secured to one another to form a single-piece integrated seal body 80. In some embodiments, the first portion 85 and the second portion 86 may be secured to one another via, for example, compression, welding, friction welding, adhesive, and/or mechanical engagement. Other methods of forming the packing assembly seal 78 are contemplated.

As shown in FIGS. 3A-3C, in some embodiments, the second portion 86 may include a second portion body 120 (e.g., an annular second portion body) having a second portion cross-section, and the second portion cross-section may include a stem 122 and a head 124 connected to the stem 122, with the head 124 being enlarged relative to the stem 122. For example, the first portion 85 may at least partially define the recess 102, and the second portion 86 may be at least partially received in the recess 102 of the first portion 85. For example, the stem 122 may be received in the recess 102, and the head 124 may at least partially protrude from the recess 102, for example, as shown. In some embodiments, the stem 12 may transition smoothly into the head 124, for example, as show in FIGS. 3A-3B.

Figure 4A:
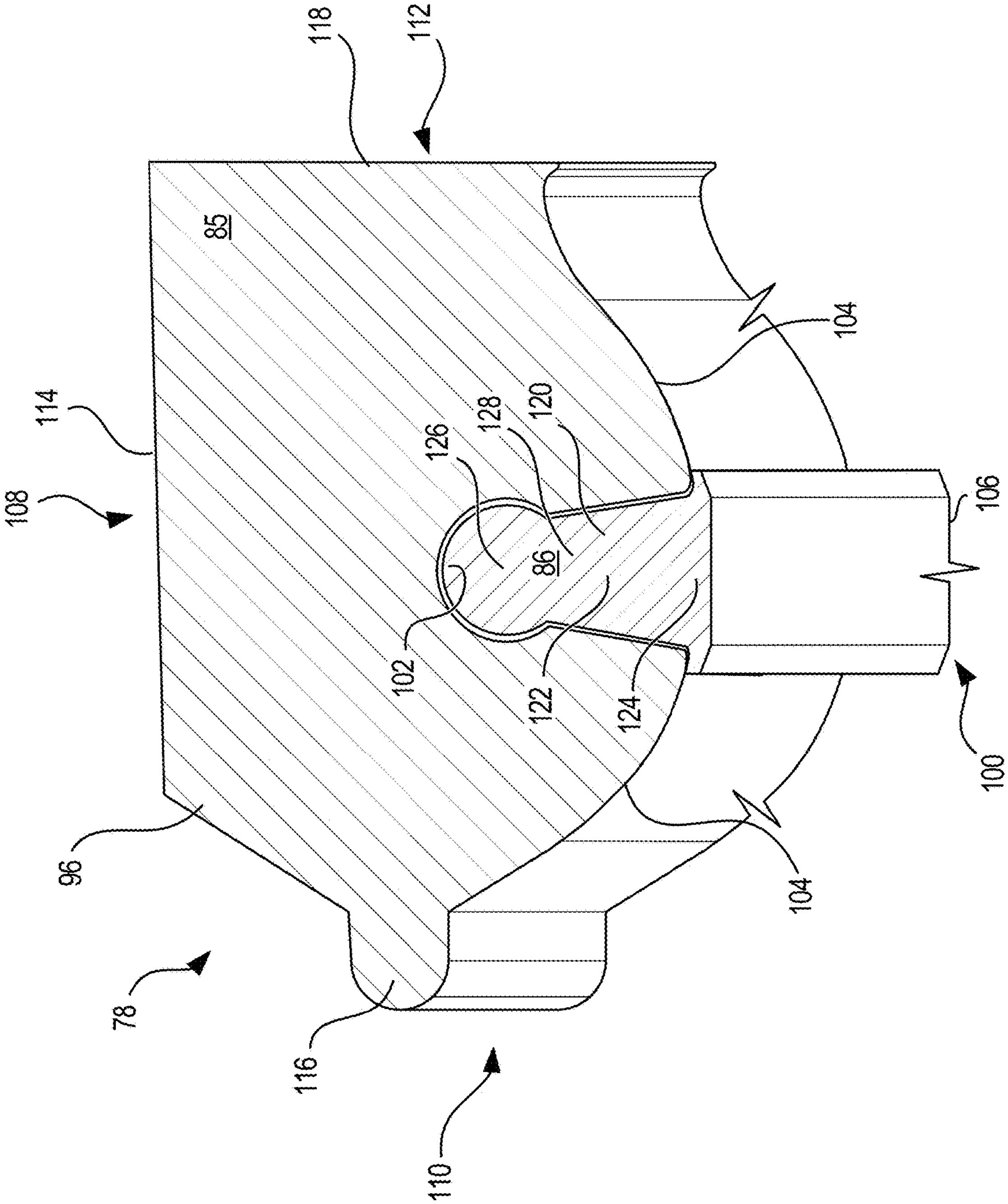
FIG. 4A is a schematic partial cross-sectional view of another example packing assembly seal, including example first and second portions, according to embodiments of the disclosure.
Figure 4B:
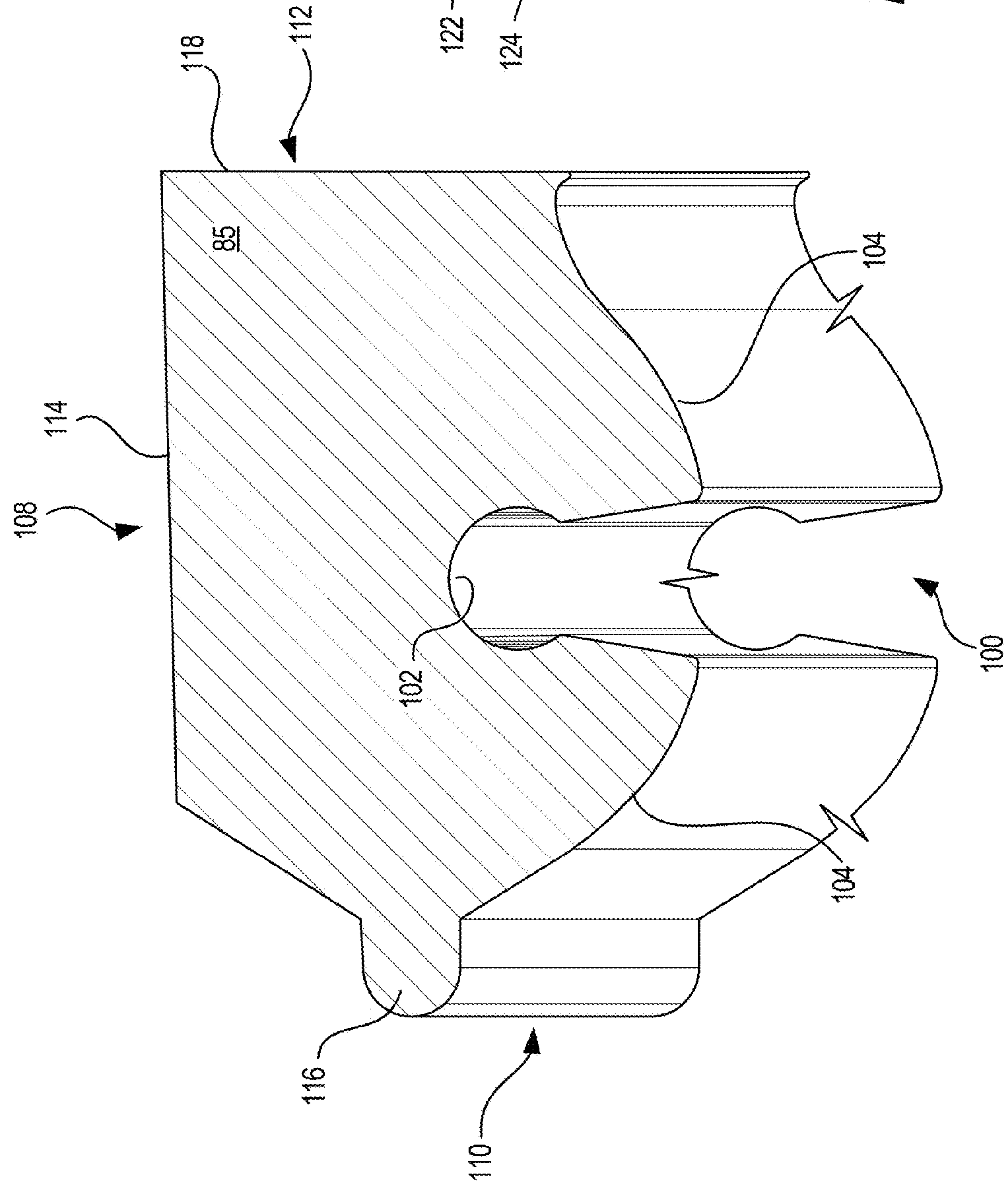
FIG. 4B is a schematic partial cross-sectional view of the example first portion of the example packing assembly seal shown in FIG. 4A, according to embodiments of the disclosure.
Figure 4C:
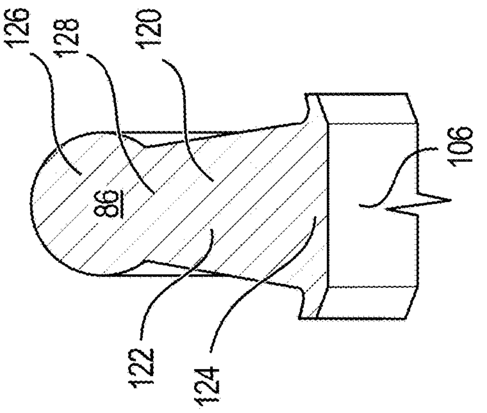
FIG. 4C is a schematic partial cross-sectional view of the example second portion of the example packing assembly seal shown in FIG. 4A, according to embodiments of the disclosure.
Figure 5A:
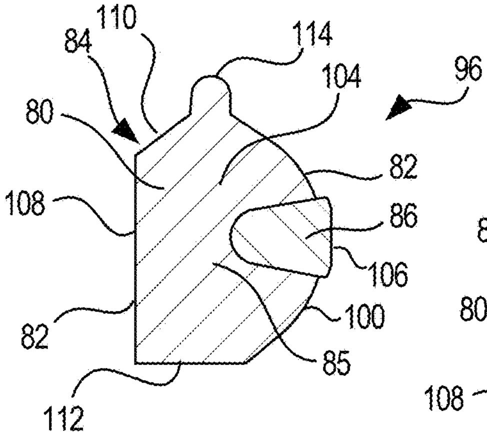
FIG. 5A is a schematic cross-section view of another example packing assembly seal, including example first and second portions, according to embodiments of the disclosure.
Figure 5B:
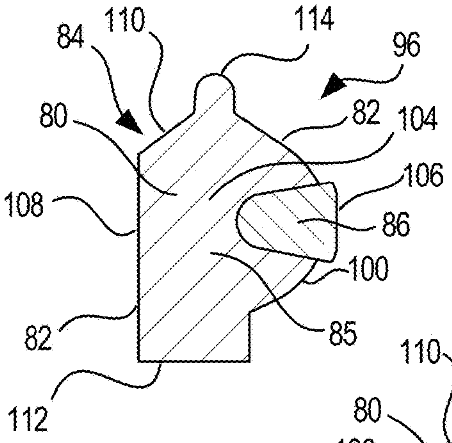
FIG. 5B is a schematic cross-section view of still another example packing assembly seal, including example first and second portions, according to embodiments of the disclosure.
Figure 5C:
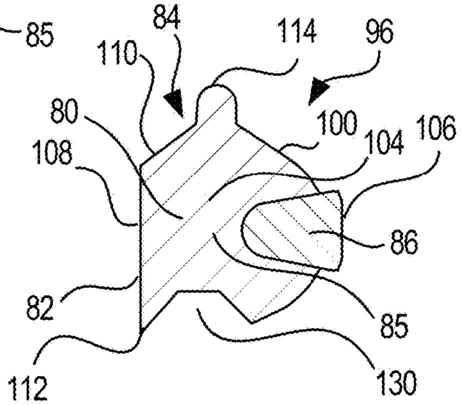
FIG. 5C is a schematic cross-section view of yet another example packing assembly seal, including example first and second portions, according to embodiments of the disclosure.
Figure 5D:
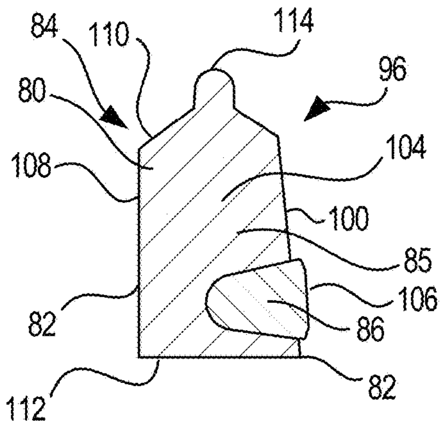
FIG. 5D is a schematic cross-section view of still a further example packing assembly seal, including example first and second portions, according to embodiments of the disclosure.
Figure 5E:
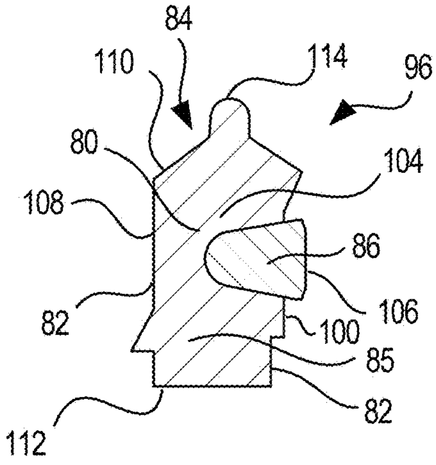
FIG. 5E is a schematic cross-section view of yet a further example packing assembly seal, including example first and second portions, according to embodiments of the disclosure.

FIG. 4A is a schematic partial cross-sectional view of another example packing assembly seal 78, including example first and second portions 85 and 86, according to embodiments of the disclosure. FIG. 4B is a schematic partial cross-sectional view of the example first portion 85 of the example packing assembly seal 78 shown in FIG. 4A, according to embodiments of the disclosure, and FIG. 4C is a schematic partial cross-sectional view of the example second portion 86 of the example packing assembly seal 78 shown in FIG. 4A, according to embodiments of the disclosure. As shown in FIGS. 4A-4C, in some embodiments, the stem 122 may at least partially define a bulb 126 and a neck 128 between the head 124 and the bulb 126, with the neck 128 having a reduced thickness relative to one or more of the bulb 126 or the head 124. In some embodiments, the head 124 of the second portion 86 may be substantially mushroom-shaped in cross-section, for example, as shown in FIGS. 4A-4B. In some embodiments, the second portion cross-section is bilaterally symmetric, for example, relative to the stem 122 of the second portion 86 (see, e.g., FIGS. 3C, 4C, and 6C). Other cross-sectional shapes of the second portion 86 are contemplated, and the first portion 85 may be configured to provide a complimentary recess for receiving at least a portion of the second portion 86.

FIGS. 5A, 5B, 5C, 5D, and 5E are schematic cross-section views of example packing assembly seals 78 having respective seal cross-sections 84, according to embodiments of the disclosure. As shown in FIGS. 5A-5E, the seal body 80 may have different seal cross-sections 84. In some embodiments, the seal cross-sections 84 may include one or more of (a) a radially inward facing surface 100 (e.g., a radially inward facing surface), (b) an outward facing surface 108 (e.g., a radially outward facing surface) substantially opposite the inward facing surface 100, (c) a first axial end surface 110, or (d) a second axial end surface 112 substantially opposite the first axial end surface 110. In some embodiments, the inward facing surface 100 may include a substantially convex portion (see, e.g., FIGS. 5A-5C). In some embodiments, the outward facing surface 108 may include a substantially planar portion (see, e.g., FIGS. 5A-5E). In some embodiments, the first axial end surface 110 may at least partially define a protrusion 116 (see, e.g., FIGS. 5A-5E). In some embodiments, the second axial end surface 112 may at least partially define a recess 130 (see, e.g., FIG. 5C). As shown in FIGS. 5A-5E, various seal cross-section 84 shapes are contemplated.

Figure 6A:
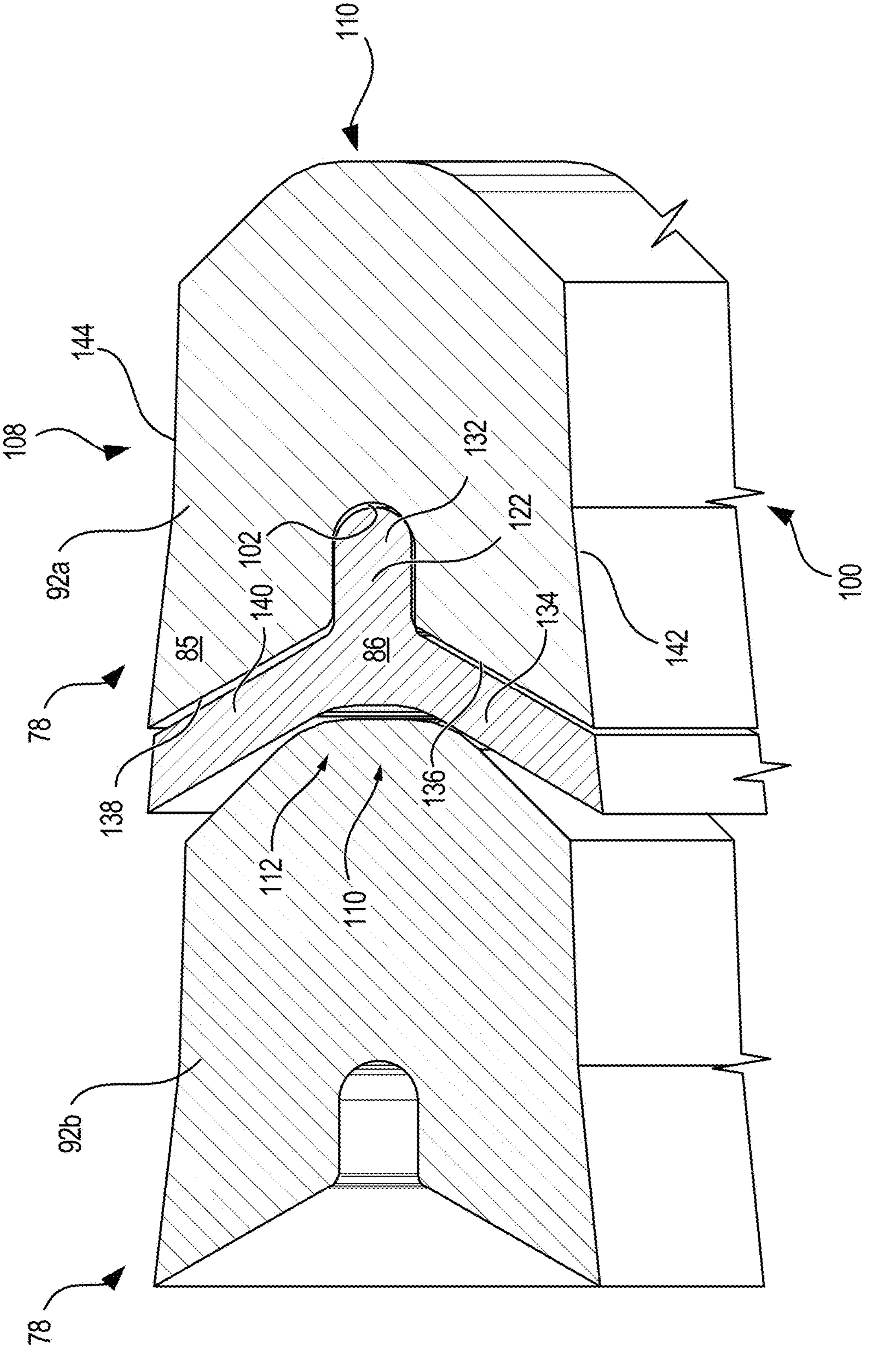
FIG. 6A is a schematic partial cross-sectional view of another example packing assembly seal, including example first and second portions, according to embodiments of the disclosure.
Figure 6C:
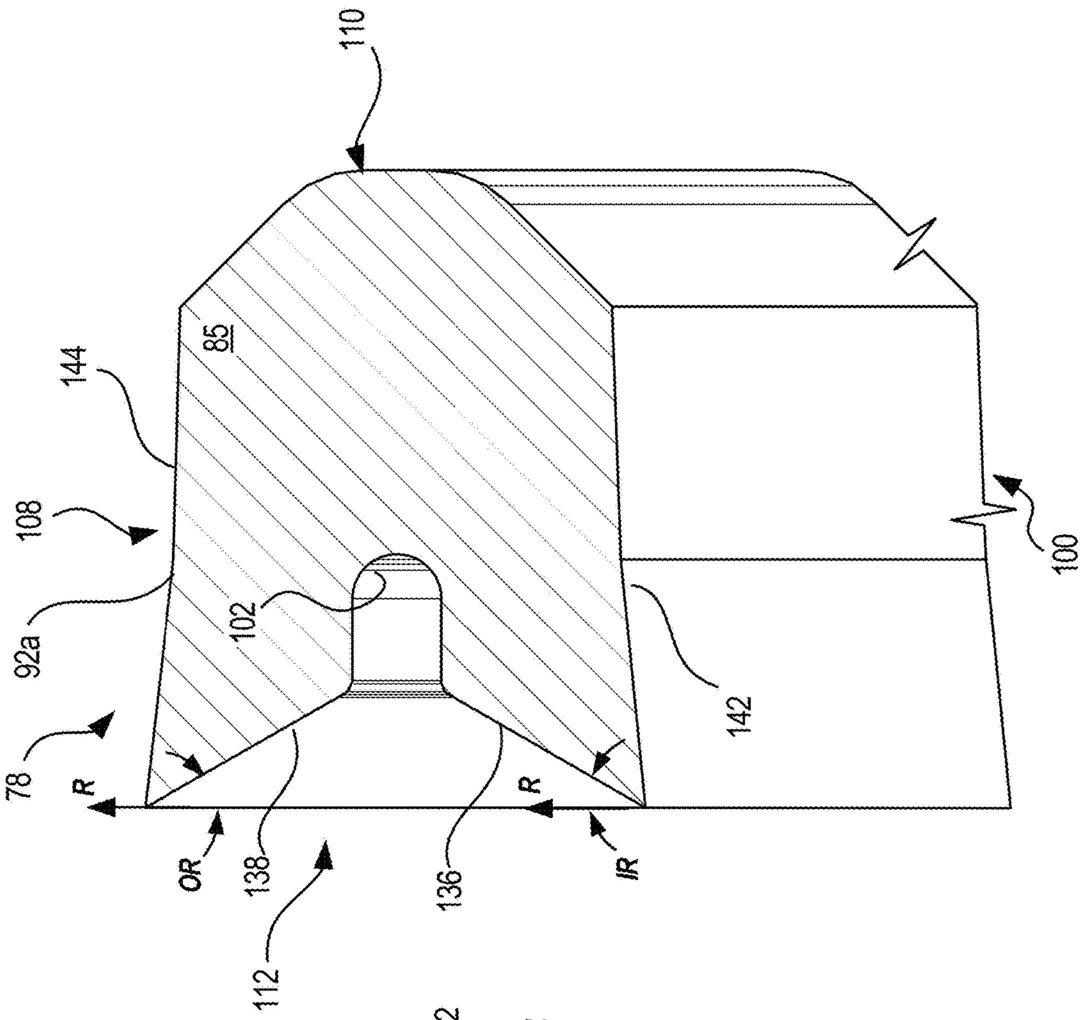
FIG. 6C is a schematic partial cross-sectional view of the example second portion of the example packing assembly seal shown in FIG. 6A, according to embodiments of the disclosure.
Figure 6B:
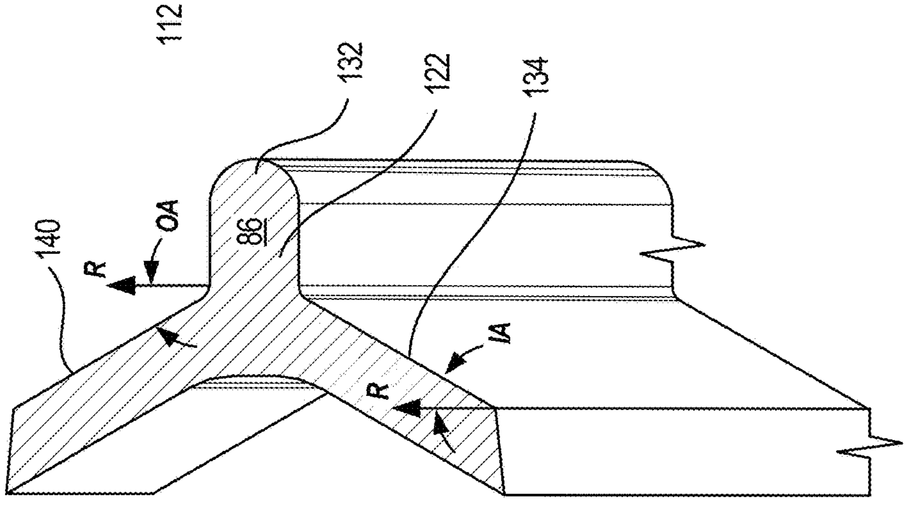
FIG. 6B is a schematic partial cross-sectional view of the example first portion of the example packing assembly seal shown in FIG. 6A, according to embodiments of the disclosure.

FIG. 6A is a schematic partial cross-sectional view of another example packing assembly seal 78, including an example first pressure ring **92*a* including example first and second portions 85 and 86, and an example second pressure ring 92*b*, according to embodiments of the disclosure. FIG. 6B is a schematic partial cross-sectional view of the example first portion 85 of the example packing assembly seal 78 shown in FIG. 6A, according to embodiments of the disclosure, and FIG. 6C is a schematic partial cross-sectional view of the example second portion 86 of the example packing assembly seal 78 shown in FIG. 6A, according to embodiments of the disclosure. As shown in FIGS. 6A-6C, for example, the packing assembly seal 78 may include a first pressure ring 92*a* including a first portion 85 and a second portion 86, as well as a second pressure ring 92*b*. As described herein, and at least similar to embodiments shown in FIGS. 3A-4C, in some embodiments of the pressure ring 92, the first portion 85 may include (or be formed of) a first material, with the first material having a first coefficient of friction. The second portion 86 may include (or be formed of) a second material, with the second material having a second coefficient of friction less than the first coefficient of friction, thereby to reduce friction at the seal interface 79 between the packing assembly seal 78 (the first pressure ring 92*a*) and the second component, so as to reduce heat generation and extend the service life of the packing assembly seal 78 and/or the packing assembly 68, as the second component (e.g., a plunger of a pump) moves relative to the first component, for example as described herein. In some embodiments, the second pressure ring 92*b* may include a construction and/or configuration at least similar to the first pressure ring 92*a***.

In some embodiments, as shown in FIGS. 6A-6C, the first portion 85 of the pressure ring **92*a* may include a first axial end surface 110 and a second axial end surface 112 substantially opposite the first axial end surface 110, the second axial end surface 112 at least partially defining an axial recess 102 (e.g., an axial annular recess). The second portion 86 of the pressure ring 92*a* may be at least partially received in the axial recess 102 in the second axial end surface 112 of the first portion 85. For example, the second axial end surface 112 of the first portion 85 may be substantially concave and may extend between an inward facing surface 100 (e.g., a radially inward facing surface) of the first portion and an outward facing surface 108 (e.g., a radially outward facing surface) of the first portion 85. The axial recess 102 may be positioned between the inward facing surface 100 of the first portion 85 and the outward facing surface 108 of the first portion 85, and the second portion 86 may include a second portion protrusion 132 at least partially received in the axial recess 102 of the first portion 85**.

As shown in FIGS. 6A-6C, in some embodiments, the second portion 86 may include an inward extending arm 134 (e.g., a radially inward extending arm) connected to the second portion protrusion 132, with the inward extending arm 134 being positioned to bias the inward facing surface 100 of the first portion 85 inward (e.g., radially inward) against a moving component. The second axial end surface 112 of the first portion 85 may include an inner ramp surface 136 extending between the axial recess 102 of the first portion 85 and the inward facing surface 100 of the first portion 85. The inner ramp surface 136 may lie at an inner ramp angle IR relative to a radial axis R of the packing assembly seal 78. In some embodiments, the inward extending arm 134 may at least partially define an inner arm angle IA relative to the radial axis R of the packing assembly seal 78. The inner arm angle IA may be less than or equal to the inner ramp angle IR, for example, to bias the inward facing surface 100 of the first portion 85 radially inward.

In some embodiments, the second axial end surface 112 of the first portion 85 may include an outer ramp surface 138 extending between the axial recess 102 of the first portion 85 and the outward facing surface 100 of the first portion 85. The outer ramp surface 138 may lie at an outer ramp angle OR relative to the radial axis R of the packing assembly seal 78. An outward extending arm 140 (e.g., a radially outward extending arm) may at least partially defines an outer arm angle OA relative to the radial axis R of the packing assembly seal 78. In some embodiments, the outer arm angle OA may be less than or equal to the outer ramp angle OR, for example, to bias the outward facing surface 108 of the first portion 85 outward (e.g., radially outward). In some embodiments consistent with FIGS. 6A-6C, the second portion cross-section of the second portion 86 may be bilaterally symmetric relative to the stem 122 of the second portion 86.

As shown in FIGS. 6A-6C, in some embodiments, the seal cross-section 84 may include an inward facing surface 100 at least partially defined by the first portion 85, an outward facing surface 108 substantially opposite the inward facing surface 100, with the outward facing surface 108 being at least partially defined by the first portion 85. The seal cross-section 84 further may include a second axial end surface 112 at least partially defined by the second portion 86, and the seal cross-section 84 may include a first axial end surface 110 substantially opposite the second axial end surface 112 of the packing assembly seal, with the first axial end surface 110 being at least partially defined by the first portion 85. The inward facing surface 100 may include a substantially planar portion 142 at least partially defined by the first portion 85, the outward facing surface 112 may include a substantially planar portion 144 at least partially defined by the first portion 85, the first axial end surface 110 of the packing assembly seal 78 may be at least partially defined by the first portion 85 and may be at least partially convex, and/or the second axial end surface 112 of the packing assembly seal 78 may be at least partially defined by the second portion 86 and may be at least partially concave. Some such embodiments may facilitate nesting of the first axial end surface 110 of the second pressure ring **92*b* in the at least partially concave portion of the second portion 86, for example, as shown in FIG. 6A**.

In some embodiments, the one or more pressure rings 92 may include (or be formed of) one or more of fabric, composite, nitrile rubber (HNBR), polytetrafluoroethylene (PTFE), thermoplastic polyurethane (TPU), or RESILON™. As described herein, in some embodiments, the one or more pressure rings 92 may include a first portion 85 and a second portion 86. In some embodiments, the first portion 85 may include (or be formed of) one or more of fabric, composite, nitrile rubber (HNBR), polytetrafluoroethylene (PTFE), thermoplastic polyurethane (TPU), or RESILON™, and/or the second portion 86 may include (or be formed of) one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, carbon nanotube-filled UHMW-PE, composite materials having similar functional characteristics, or other materials having similar functional characteristics. In some embodiments, the first portion 85 of the one or more pressure rings 92 may include (or be formed of) a material having a first coefficient of friction, and the first coefficient of friction may range from about 0.11 to about 0.9. Other ranges are contemplated. In some embodiments, the second portion 86 of the one or more pressure rings 92 may be include (or be formed of) a material having a second coefficient of friction, and the second coefficient of friction may range from about 0.01 to about 0.1. Other ranges are contemplated.

In some embodiments, the first coefficient of friction of the first portion 85 may include a first coefficient of static friction and/or a first coefficient of kinetic friction. The second coefficient of friction may include a second coefficient of static friction and/or a second coefficient of kinetic friction. In some embodiments, the second coefficient of static friction and/or the second coefficient of kinetic friction may be less than the first coefficient of static friction and/or the first coefficient of kinetic friction.

In some embodiments, the first portion 85 of the pressure ring 92 may include (or be formed of) metal mesh, and the metal mesh may include one or more of aluminum, aluminum alloy, brass, brass alloy, bronze, bronze alloy, silver, silver alloy, copper, copper alloy, steel, or steel alloy. In some embodiments, the second portion 86 of the pressure ring 92 may include (or be formed of) one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, carbon nanotube-filled UHMW-PE, composite materials having similar functional characteristics, or other materials having similar functional characteristics. In some embodiments, the first portion 85 of the pressure ring 92 may include (or be formed of) a material having a first coefficient of friction, and the first coefficient of friction may range from about 0.11 to about 0.9. Other ranges are contemplated. In some embodiments, the second portion 86 of the pressure ring 92 may be include (or be formed of) a material having a second coefficient of friction, and the second coefficient of friction may range from about 0.01 to about 0.1. Other ranges are contemplated.

In some embodiments, the first portion 85 and the second portion 86 of the pressure ring 92 may be molded together to form a single-piece integrated seal body 80. In some embodiments, the first portion 85 and the second portion 86 may be co-extruded and formed into the seal body 80 (e.g., a single-piece integrated annular seal body). In some embodiments, the first portion 85 and the second portion 86 may be formed separately and secured to one another to form a single-piece integrated seal body 80. In some embodiments, the first portion 85 and the second portion 86 may be secured to one another via, for example, compression, welding, friction welding, adhesive, and/or mechanical engagement. Other methods of forming the packing assembly seal 78 are contemplated.

Figure 7A:
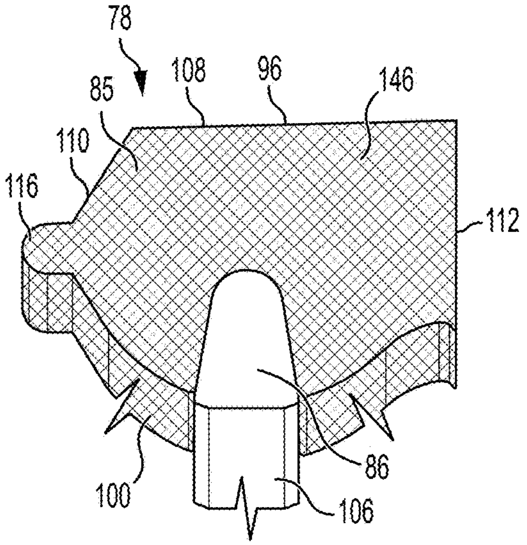
FIG. 7A is a schematic partial cross-sectional view of an example packing assembly seal, including an example first portion having example fiber-reinforcement, and an example second portion, according to embodiments of the disclosure.

FIG. 7A is a schematic partial cross-section view of another example packing assembly seal 78 (e.g., a header ring 96, as shown, or a pressure ring 92), including an example first portion 85 having example fiber-reinforcement 146, and an example second portion 86, according to embodiments of the disclosure. As schematically depicted in FIG. 7A, in some embodiments, the fiber-reinforcement 146 may be distributed substantially throughout the first portion 85, which may also include sealing material, such as, for example, one or more sealing materials described herein. In some embodiments, for example, the fiber-reinforcement

146 may be distributed substantially homogenously throughout the first portion 85. The fiber-reinforcement 146 may include a plurality of individual fibers substantially evenly distributed throughout the first portion 85. In some embodiments, the fibers may be combined and/or mixed with sealing material and formed into the first portion 85. The sealing material may include any non-fiber materials described herein. In some embodiments, the fiber-reinforcement 146 may include a fabric including fibers, such as, for example, woven fabric including fibers and/or non-woven fabric including fibers, such as, for example, woven mesh and/or non-woven mesh. In some embodiments, fiber-reinforcement 146 may include one or more layers of fabric including fibers, for example, formed into (e.g., molded via pressure and/or heat) the annular form of the packing assembly seal 78. In some embodiments, the fiber-reinforcement 146 may include a combination fabric including fibers and a plurality of individual fibers.

In some embodiments, the fiber-reinforcement 146 may include, for example, a woven metal mesh, a non-woven metal mesh, a metal woven fabric, a metal non-woven fabric, a plurality of layers of metal mesh, a plurality of layers of metal mesh compressed into the seal body (e.g., an annular seal body), a non-woven non-metal mesh, a woven non-metal mesh, a woven non-metal fabric, a non-woven non-metal fabric, fabric-reinforced rubber, aramid-reinforced rubber, fiber-reinforced rubber, carbon fiber-reinforced rubber, cotton fiber-reinforced rubber, polyethylene terephthalate (PET) fiber-reinforced rubber, polyester fiber-reinforced rubber, cotton fibers, aramid fibers, carbon fibers, PET fibers, polyester fibers, and/or a combination thereof. Other materials having similar material characteristics and/or a similar material performance are contemplated.

Figure 7B:
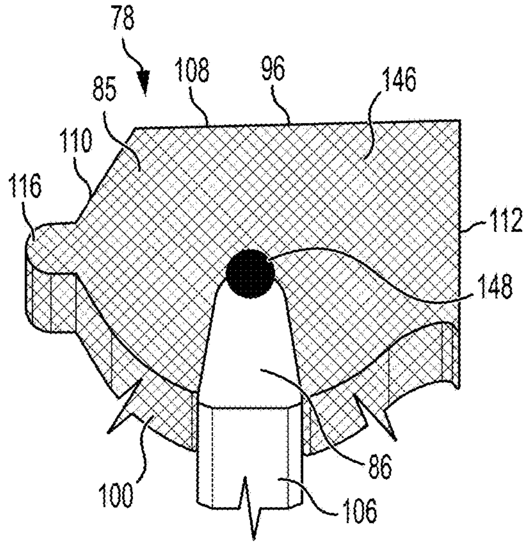
FIG. 7B is a schematic partial cross-sectional view of another example packing assembly seal, including an example first portion having example fiber-reinforcement, an example second portion, and an example seal energizer, according to embodiments of the disclosure.

FIG. 7B is a schematic partial cross-section view of another example packing assembly seal 78 (e.g., a header ring 96, as shown, or a pressure ring 92), including an example first portion 85 having example fiber-reinforcement 146, an example second portion 86, and an example seal energizer 148, according to embodiments of the disclosure. In some embodiments, the seal energizer 148 may be annular and configured and/or positioned to improve the performance of the packing assembly seal 78, such as the effectiveness to maintain a seal in harsh operating conditions, such as, for example, under high pressure and/or under high temperature, among other possible benefits. In some embodiments, the seal energizer 148 may include a spring or an O-ring, for example, as shown in FIG. 7B. Other types of seal energizers are contemplated. As shown in FIG. 7B, in some embodiments, the seal energizer 148 may be positioned between the first portion 85 of the packing assembly seal 78 and the second portion 86 of the packing assembly seal 78. This may enhance or improve the performance of the first portion 85 of the packing assembly seal 78 and/or the second portion 86 of the packing assembly seal 78.

Figure 7C:
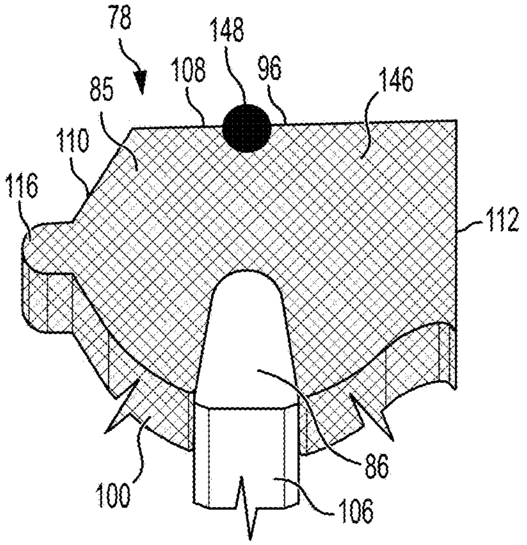
FIG. 7C is a schematic partial cross-sectional view of a further example packing assembly seal, including an example first portion having example fiber-reinforcement, an example second portion, and an example seal energizer, according to embodiments of the disclosure.

FIG. 7C is a schematic partial cross-section view of a further example packing assembly seal 78 (e.g., a header ring 96, as shown, or a pressure ring 92), including an example first portion 85 having example fiber-reinforcement 146, an example second portion 86, and an example seal energizer 148, according to embodiments of the disclosure. As shown in FIG. 7C, in some embodiments, the seal cross-section may include (a) an inward facing surface 100 (e.g., a radially inward facing surface) at least partially defined by the first portion 85 of the packing assembly seal 78, and (b) an outward facing surface 108 (e.g., a radially outward facing surface) opposite the inward facing surface 100 at least partially defined by the first portion 85 of the packing assembly seal 78. As shown in FIG. 7C, for example, in some embodiments, the seal energizer 148 may be at least partially received in the outward facing surface 108 of the first portion 85. This may enhance or improve the performance of the first portion 85 of the packing assembly seal 78 and/or the second portion 86 of the packing assembly seal 78.

Figure 7D:
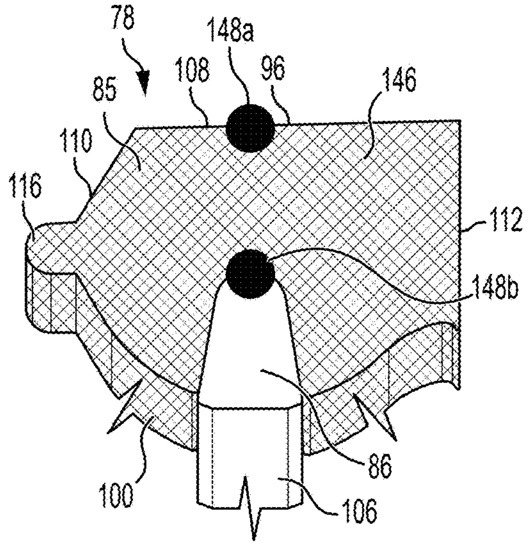
FIG. 7D is a schematic partial cross-sectional view of yet another example packing assembly seal, including an example first portion having example fiber-reinforcement, an example second portion, and example seal energizers, according to embodiments of the disclosure.

FIG. 7D is a schematic partial cross-section view of yet another example packing assembly seal 78 (e.g., a header ring 96, as shown, or a pressure ring 92), including an example first portion 85 having example fiber-reinforcement 146, an example second portion 86, and example seal energizers 148*a* and 148*b*, according to embodiments of the disclosure. As shown, in some embodiments, the packing assembly seal 78 may include a first seal energizer 148*a* at least partially received in the outward facing surface 108 of the first portion 85 of the packing assembly seal 78. In some embodiments, a second seal energizer 148*b* may be positioned between the first portion 85 of the packing assembly seal 78 and the second portion 86 of the packing assembly seal 78, for example, as shown. This may improve the performance of the first portion 85 of the packing assembly seal 78 and/or the second portion 86 of the packing assembly seal 78. Additional sealing energizers at different cross-sectional locations of the packing assembly seal 78 are contemplated.

Figure 8A:
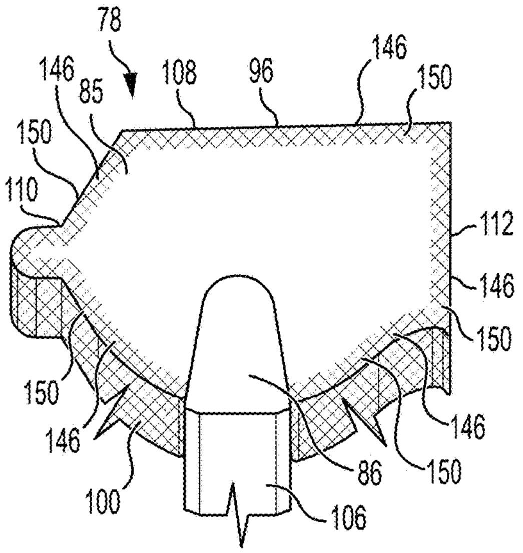
FIG. 8A is a schematic partial cross-sectional view of another example packing assembly seal, including an example first portion having a surface with example fiber-reinforcement, and an example second portion, according to embodiments of the disclosure.

FIG. 8A is a schematic partial cross-section view of another example packing assembly seal 78 (e.g., a header ring 96, as shown, or a pressure ring 92), including an example first portion 85 having a surface 150 with example fiber-reinforcement 146, and an example second portion 86, according to embodiments of the disclosure. In some embodiments consistent with FIGS. 8A-8D, the packing assembly seal 78 may have a seal cross-section including: (a) an inward facing surface 100 (e.g., a radially inward facing surface) at least partially defined by the first portion 85 of the packing assembly seal 78; (b) an outward facing surface 108 (e.g., a radially outward facing surface) opposite the inward facing surface 100; (c) a first axial end surface 110 at least partially defined by the first portion 85; and (d) a second axial end surface 112 substantially opposite the first axial end surface 110. In some embodiments, the second axial end surface 112 may be at least partially defined by the first portion 85. As shown, in some embodiments, the fiber-reinforcement 146 may include one or more fiber-reinforcement layers at least partially covering: (a) the inward facing surface 100; (b) the outward facing surface 108; (c) the first axial end surface 110; and/or (d) the second axial end surface 112. In some embodiments, the one or more fiber-reinforcement layers may include, for example, a woven metal mesh, a non-woven metal mesh, a metal woven fabric, a metal non-woven fabric, a plurality of layers of metal mesh, a plurality of layers of metal mesh compressed into the seal body 80, a non-woven non-metal mesh, a woven non-metal mesh, a woven non-metal fabric, a non-woven non-metal fabric, fabric-reinforced rubber, aramid-reinforced rubber, fiber-reinforced rubber, carbon fiber-reinforced rubber, cotton fiber-reinforced rubber, polyethylene terephthalate (PET) fiber-reinforced rubber, polyester fiber-reinforced rubber, cotton fibers, aramid fibers, carbon fibers, PET fibers, polyester fibers, and/or a combination thereof. Other materials having similar material characteristics and/or a similar material performance are contemplated.

Figure 8B:
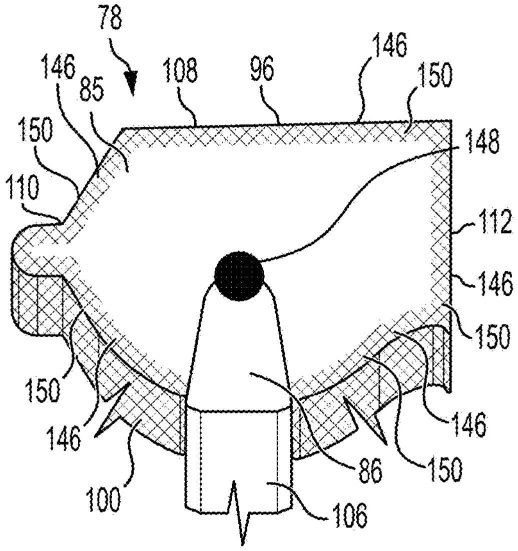
FIG. 8B is a schematic partial cross-sectional view of another example packing assembly seal, including an example first portion having a surface with example fiber-reinforcement, an example second portion, and an example seal energizer, according to embodiments of the disclosure.

FIG. 8B is a schematic partial cross-section view of another example packing assembly seal 78 (e.g., a header ring 96, as shown, or a pressure ring 92), including an example first portion 85 having a surface 150 with example fiber-reinforcement 146, an example second portion 86, and an example seal energizer 148, according to embodiments of the disclosure. In some embodiments, the seal energizer 148 may be configured and/or positioned to improve the performance of the packing assembly seal 78, such as the effectiveness to maintain a seal in harsh operating conditions, such as, for example, under high pressure and/or under high temperature, among other possible benefits, as described herein. In some embodiments consistent with FIGS. 8B-8D, the seal energizer 148 may include a spring or an O-ring, for example, as shown in FIG. 8B. As shown in FIG. 8B, in some embodiments, the seal energizer 148 may be positioned between the first portion 85 of the packing assembly seal 78 and the second portion 86 of the packing assembly seal 78. This may enhance or improve the performance of the first portion 85 of the packing assembly seal 78 and/or the second portion 86 of the packing assembly seal 78.

Figure 8C:
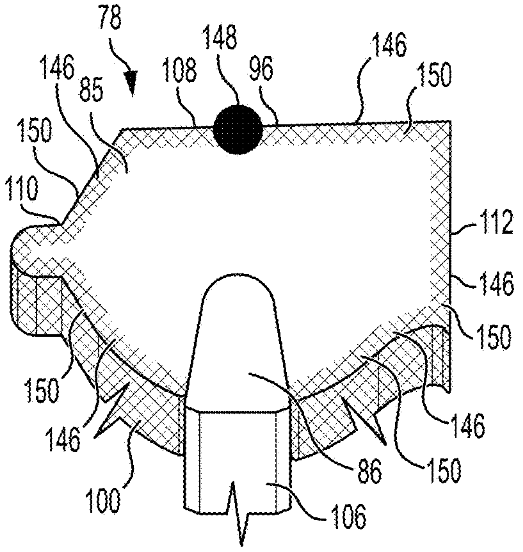
FIG. 8C is a schematic partial cross-sectional view of a further example packing assembly seal, including an example first portion having a surface with example fiber-reinforcement, an example second portion, and an example seal energizer, according to embodiments of the disclosure.

FIG. 8C is a schematic partial cross-section view of a further example packing assembly seal 78 (e.g., a header ring 96, as shown, or a pressure ring 92), including an example first portion 85 having a surface 150 with example fiber-reinforcement 146, an example second portion 86, and an example seal energizer 148, according to embodiments of the disclosure. As shown in FIG. 8C, in some embodiments, the seal cross-section may include (a) an inward facing surface 100 at least partially defined by the first portion 85 of the packing assembly seal 78, and (b) an outward facing surface 108 opposite the inward facing surface 100 at least partially defined by the first portion 85 of the packing assembly seal 78. As shown in FIG. 8C, for example, in some embodiments, the seal energizer 148 may be at least partially received in the outward facing surface 108 of the first portion 85. This may improve the performance of the first portion 85 of the packing assembly seal 78 and/or the second portion 86 of the packing assembly seal 78.

Figure 8D:
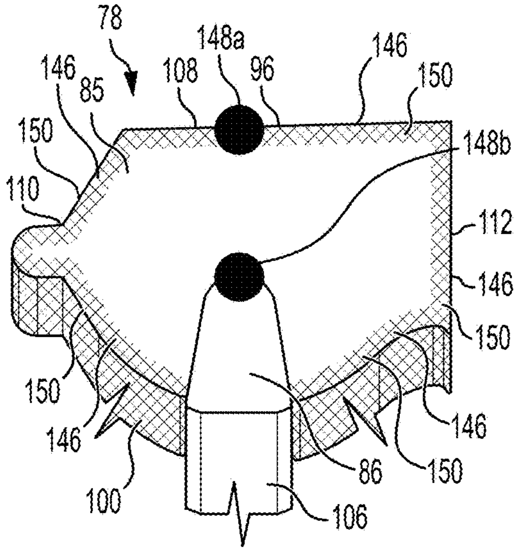
FIG. 8D is a schematic partial cross-sectional view of yet another example packing assembly seal, including an example first portion having a surface with example fiber-reinforcement, an example second portion, and example seal energizers, according to embodiments of the disclosure.

FIG. 8D is a schematic partial cross-section view of yet another example packing assembly seal 78 (e.g., a header ring 96, as shown, or a pressure ring 92), including an example first portion 85 having a surface 150 with example fiber-reinforcement 146, an example second portion 86, and example seal energizers 148*a* and 148*b*, according to embodiments of the disclosure. As shown, in some embodiments, the packing assembly seal 78 may include a first seal energizer 148*a* at least partially received in the outward facing surface 108 of the first portion 85 of the packing assembly seal 78. In some embodiments, a second seal energizer 148*b* may be positioned between the first portion 85 of the packing assembly seal 78 and the second portion 86 of the packing assembly seal 78, for example, as shown. This may improve the performance of the first portion 85 of the packing assembly seal 78 and/or the second portion 86 of the packing assembly seal 78. Additional sealing energizers at different cross-sectional locations of the packing assembly seal 78 are contemplated.

Example methods are described below, according to embodiments of the disclosure. The order in which the method steps are described is not intended to be construed as a limitation, and any number of the described method steps may be combined in any order and/or in parallel to implement the methods.

A method for enhancing a seal (e.g., a fluid seal) between a surface of a first component (e.g., a fluid end block 18, as shown in FIG. 1) of a machine and a surface of a second component (e.g., a plunger 22, as shown in FIG. 1) of the machine (e.g., a high-power pump 10, as shown in FIG. 1), may include positioning a seal (e.g., a packing assembly seal 78) between the surface of the first component and the surface of the second component. The seal may include a seal body 80 having a seal body surface 82 and a seal cross-section 84 at least partially defined by the seal body surface 82, for example, as shown in FIGS. 3A-8D. In some embodiments, the seal body 80 may include (or be formed into) an annular seal body. The seal body 80 may include a first portion 85 including a first material, the first material having a first coefficient of friction. The seal body 80 further may include a second portion 86 including a second material, the second material having a second coefficient of friction less than the first coefficient of friction, thereby to reduce friction at a seal interface 79 (see, e.g., FIGS. 2A and 2C) between the seal 78 and the second component. The method further may include suppressing generation of heat associated with the seal 78 between a first component and a second component. For example, in some embodiments of the method, the suppressing of the generation of heat associated with the seal 78 between the first component and the second component may include suppressing the generation of heat associated with the seal 78 between the first component and the second component, via the second portion 86 of the seal, during operation of the machine as the second component moves relative to the first component, for example, as described herein.

In some embodiments of the method, the positioning of the seal 78 between the surface of the first component and the surface of the second component may include positioning one or more of a header ring 96, a scraper ring, or a pressure ring 92 between the surface of the first component and the surface of the second component, for example, as described herein. In some embodiments, the positioning of the seal 78 between the surface of the first component and the surface of the second component of the machine may include positioning the seal 78 between a stationary component of the pump (e.g., a fluid end block 18) and one of (a) a reciprocating component of the pump (e.g., a plunger 22) or (b) a rotating component of the pump, for example, as described herein. For example, the positioning of the seal 78 may include positioning the seal 78 between a plunger 22 of a pump 10 and a fluid end 12 of the pump 10. For example, the machine may include a hydraulic fracturing pump, as described herein. The positioning of the seal 78 between the surface of the first component and the surface of the second component of the machine may include positioning the seal 78 between a reciprocating rod of the machine and a stationary part of the machine.

In some embodiments of the method, the first portion 85 of the seal 78 may include an inward facing surface 100 (e.g., a radially inward facing surface), and the first portion 85 may at least partially define a recess 102 (e.g., an annular recess) (see, e.g., FIGS. 3A-6C) in the inward facing surface 100 of the first portion 85 of the seal 78. The second portion 86 of the seal 78 may be at least partially received in the recess 102 in the inward facing surface 100 of the first portion 84 of the seal 78. For example, the inward facing surface 100 of the first portion 85 may be substantially convex and may at least partially define a curved surface, and the second portion 86 of the seal 78 may include an inward facing surface 106 (e.g., a radially inward facing surface). In some embodiments, the inward facing surface 106 of the second portion 86 of the seal 78 may project inward relative to the curved surface of the inward facing surface 100 of the first portion 85 of the seal 78.

In some embodiments of the method, for example, as shown in FIGS. 6A-6C, the first portion 85 of the seal 78 (e.g., a pressure ring 92) may include a first axial end surface 110 and a second axial end surface 112 substantially opposite the first axial end surface 110. The second axial end surface 112 may at least partially define an axial recess 102, and the second portion 86 of the seal 78 may be at least partially received in the axial recess 102 in the second axial end surface 112 of the first portion 85 of the seal 78. The second axial end surface 112 of the first portion 85 may be substantially concave and may extend between an inward facing surface 100 of the first portion 85 and an outward facing surface 108 of the first portion 85. The axial recess 102 may be positioned between the inward facing surface 100 of the first portion 85 and the outward facing surface 108 of the first portion 85 of the seal 78. In some embodiments, the second portion 86 of the seal 78 may include a second portion protrusion 132 at least partially received in the axial recess 102 of the first portion 85 of the seal 78, for example, as described herein. In some embodiments, an inward extending arm 134 (e.g., a radially inward extending arm) may be connected to the second portion protrusion 132, and the inward extending arm 134 may be positioned to bias the inward facing surface 100 of the first portion 85 of the seal 78 inward (e.g., radially inward), for example, as described herein with respect to FIGS. 6A-6C. For example, the second axial end surface 112 of the first portion 85 may include an inner ramp surface 136 extending between the axial recess 102 of the first portion 85 and the inward facing surface 100 of the first portion 85. The inner ramp surface 136 may lie at an inner ramp angle IR relative to a radial axis R of the seal 78, for example, as described herein (see, e.g., FIG. 6C). The inward extending arm 134 may at least partially define an inner arm angle IA relative to the radial axis R of the seal 78, and the inner arm angle IA may be less than or equal to the inner ramp angle IR. In some embodiments of the method, the second portion 86 of the seal 78 may further include an outward extending arm 140 (e.g., a radially outward extending arm) connected to the second portion protrusion 132, and the outward extending arm 140 may be positioned to bias the outward facing surface 108 of the first portion 85 of the seal outward (e.g., radially outward).

In some embodiments of the method, the second coefficient of friction may range from about 0.01 to about 0.1, and the first coefficient of friction may range from about 0.11 to about 0.9. In some embodiments, the material of the second portion 86 of the seal 78 may include one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, or carbon nanotube-filled UHMW-PE. Other materials having similar material characteristics and/or performance characteristics are contemplated.

In some embodiments of the method, the method further may include transferring, via operation of the machine (e.g., a high-power pump 10), a portion of the second material onto the second component (e.g., the plunger 22). In some embodiments, the transferring of the portion of the second material onto the second component may result in lubricating the seal interface 79, for example, as described herein.

Some embodiments of the method may include incorporating fiber-reinforcement 146 in the first portion 85 of the seal body 80, for example, as shown in FIGS. 7A-8D. For example, the incorporating of fiber-reinforcement 146 in the first portion 85 may include distributing the fiber-reinforcement 146 substantially throughout the first portion 85, for example, as shown in FIGS. 7A-7D. In some embodiments, the fiber-reinforcement 146 may be distributed substantially homogenously throughout the first portion 85. In some embodiments, the incorporating of fiber-reinforcement 146 in the first portion 146 may include incorporating one or more layers of fiber reinforcement 146 (e.g., fiber-reinforced material) in the first portion 85. In some embodiments of the method, the incorporating of fiber-reinforcement 146 in the first portion 85 may include, for example, incorporating in the first portion 85 one or more of: a woven metal mesh, a non-woven metal mesh, a metal woven fabric, a metal non-woven fabric, a plurality of layers of metal mesh, a plurality of layers of metal mesh compressed into the seal body 80 (e.g., into an annular seal body), a non-woven non-metal mesh, a woven non-metal mesh, a woven non-metal fabric, a non-woven non-metal fabric, fabric reinforced rubber, aramid reinforced rubber, fiber reinforced rubber, carbon fiber reinforced rubber, cotton fiber reinforced rubber, polyethylene terephthalate (PET) fiber reinforced rubber, polyester fiber reinforced rubber, cotton fibers, aramid fibers, carbon fibers, PET fibers, or polyester fibers.

In some embodiments of the method, the incorporating of fiber-reinforcement 146 in the first portion 85 of the seal body 80 may include positioning one or more fiber-reinforcement 146 layers at least partially covering one or more of: (a) an inward facing surface 100 at least partially defined by the first portion 85; (b) an outward facing surface 108 at least partially defined by the first portion 85; (c) a first axial end surface 110 at least partially defined by the first portion 85; or (d) a second axial end surface 112 at least partially defined by the first portion 85, for example, as shown in FIGS. 8A-8D.

Some embodiments of the method further may include incorporating one or more seal energizers 148 into the seal body 80, for example, as shown in FIGS. 7B-7D and FIGS. 8B-8D. In some embodiments, the one or more seal energizers 148 may include a spring and/or an O-ring. Other types of seal energizers are contemplated.

In some embodiments of the method, the incorporating of the one or more seal energizers 148 into the seal body 80 may include positioning the one or more seal energizers 148 between the first portion 85 and the second portion 86 of the packing assembly seal 78, for example, as shown in FIGS. 7B and 7D and FIGS. 8B and 8D. In some embodiments of the method, the incorporating of the one or more seal energizers 148 into the seal body 80 may include positioning the one or more seal energizers 148 in the outward facing surface 108 at least partially defined by the first portion 85, for example, as shown in FIGS. 7C and 7D and FIGS. 8C and 8D. In some embodiments, the incorporating of the one or more seal energizers 148 into the seal body 80 may include positioning: (a) a first seal energizer 148*a* in the outward facing surface 108 at least partially defined by the first portion 85, and (b) a second seal energizer 148*b* between the first portion 85 and the second portion 86 of the seal body 80, for example as shown in FIGS. 7D and 8D. Other locations in the seal body 80 for the seal energizers are contemplated.

A method for increasing the service life of a seal for providing a seal (e.g., a fluid seal) between a surface of a first component (e.g., a fluid end block 18, as shown in FIG. 1) of a machine and a surface of a second component (e.g., a plunger 22, as shown in FIG. 1) of the machine (e.g., a high-power pump 10, as shown in FIG. 1), may include may include positioning a seal 78 between the surface of the first component and the surface of the second component. The seal 78 may include a seal body 80 having a seal body surface 82 and a seal cross-section 84 at least partially defined by the seal body surface 82. In some embodiments, the seal body 80 may include (or be formed into) an annular seal body. In some embodiments, the seal body 80 may include a first portion 85 including a first material. The first material may have a first coefficient of friction. The seal body 80 further may include a second portion 86 including a second material, and the second material may have a second coefficient of friction less than the first coefficient of friction, thereby to reduce friction at a seal interface 79 between the seal 78 and the second component. The method further may include suppressing generation of heat associated with the seal 78 between the first component and the second component. For example, in some embodiments of the method, the suppressing of the generation of heat associated with the seal 78 between the first component and the second component may include the suppressing of the generation of heat associated with the seal 78 between the first component and the second component, via the second portion 86 of the seal 78, during operation of the machine, as the second component moves relative to the first component, thereby extending the service life of the seal 78, for example, as described herein.

In some embodiments of the method, the positioning of the seal 78 between the surface of the first component and the surface of the second component may include positioning one or more of a header ring 96, a scraper ring, or a pressure ring 92 between the surface of the first component and the surface of the second component. The positioning of the seal 78 between the surface of the first component and the surface of the second component of the machine may include positioning the seal 78 between a stationary component of the pump and one of (a) a reciprocating component of the pump or (b) a rotating component of the pump. For example, in some embodiments, the positioning of the seal 78 may include positioning the seal 78 between a plunger 22 of a pump 10 and a fluid end 12 of the pump 10. In some embodiments, the pump 10 may be a hydraulic fracturing pump. Other types of pumps are contemplated. In some embodiments, the seal 78 may be a packing assembly seal 78. Other types of seals are contemplated. The positioning of the seal 78 between the surface of the first component and the surface of the second component machine may include positioning the seal 78 between a reciprocating rod of the machine and a stationary part of the machine.

A method for enhancing a seal (e.g., a fluid seal) between the surface of a first component of a pump and the surface of a second component of the pump, may include positioning, between the surface of the first component of the pump and the surface of the second component of the pump, a seal 78 having a seal body 80 including a seal body surface 82 and a seal cross-section 84 at least partially defined by the seal body surface 82. In some embodiments, the seal body 80 may include (or be formed into) an annular seal body. The seal body 80 may include a first portion 85 including a first material, and the first material may have a first coefficient of friction. The seal body 80 further may include a second portion 86 including a second material, and the second material may have a second coefficient of friction less than the first coefficient of friction, thereby to reduce friction at a seal interface 79 between the seal 78 and the second component of the pump, so as to reduce heat generation and extend a service life of the seal 78 as the second component of the pump moves relative to the first component, for example, as described herein.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This application claims priority to, and the benefit of U.S. Provisional Application No. 63/852,220, filed Jul. 28, 2025, titled "SYSTEMS, ASSEMBLIES, APPARATUSES, AND METHODS PROVIDING ENHANCED FLUID SEAL BETWEEN MACHINE COMPONENTS," and U.S. Provisional Application No. 63/720,038, filed Nov. 13, 2024, titled "SYSTEMS, ASSEMBLIES, APPARATUSES, AND METHODS PROVIDING ENHANCED FLUID SEAL BETWEEN MACHINE COMPONENTS," the disclosures of which are incorporated herein by reference in their entirety.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A fluid end comprising:

a fluid end block at least partially defining a fluid end bore;

a packing recess associated with the fluid end bore, the packing recess at least partially defining a packing recess bore; and a packing assembly at least partially received in the packing recess bore, the packing assembly positioned to enhance a seal between the packing recess and a plunger reciprocating relative to the fluid end block, the packing assembly comprising:

(a) a header ring comprising a first seal body having a first seal body surface and a first seal cross-section at least partially defined by the first seal body surface, the first seal body comprising:

(i) a first portion including a first material, the first material having a first coefficient of friction ranging from 0.11 to 0.9, and (ii) a second portion including a second material, the second material having a second coefficient of friction less than the first coefficient of friction, thereby to reduce friction at a seal interface between the header ring and the plunger, so as to reduce heat generation and extend a service life of the header ring as the plunger moves relative to the packing recess, the first portion including an inward facing surface, the first portion at least partially defining a recess in the inward facing surface, the second portion at least partially received in the recess in the inward facing surface of the first portion, the second portion including an inward facing surface, the inward facing surface of the second portion projecting inward relative to the inward facing surface of the first portion, and the inward facing surface of the second portion positioned at the seal interface between the packing assembly seal and the plunger, (b) a first pressure ring including a second seal body having a second seal body surface and a second seal cross-section at least partially defined by the second seal body surface, the second seal body comprising:

(i) a third portion including a first axial end surface, a second axial end surface substantially opposite the first axial end surface, an inward facing surface. and an outward facing surface, the second axial end surface at least partially defining an axial recess, the third portion having a third coefficient of friction ranging from 0.11 to 0.9, and (ii) a fourth portion having a fourth coefficient of friction less than the third coefficient of friction, the fourth portion including:

(1) a fourth portion protrusion at least partially received in the axial recess of the third portion, (2) an inward extending arm connected to the fourth portion protrusion, the inward extending arm positioned to bias the inward facing surface of the third portion of the second seal body radially inward, and (3) an outward extending arm connected to the fourth portion protrusion, the outward extending arm positioned to bias the outward facing surface of the third portion of the second seal body radially outward, (c) a second pressure ring between the header ring and the first pressure ring, and (d) a lantern ring.

2. The fluid end of claim 1, wherein:

the packing assembly further comprises a junk ring, and the header ring is positioned between the first pressure ring and the junk ring.

3. The fluid end of claim 1, wherein one or more of:

(a) the lantern ring comprises one or more of bronze, aluminum, or brass, (b) the packing assembly further includes a lube seal, the lube seal comprising one or more of an O-ring seal, natural rubber, synthetic rubber, polymeric material, nitriles, fluorocarbon resins, or silicone resins, (c) the packing assembly further includes an adaptor ring, the adaptor ring comprising one or more of bronze, aluminum, or brass;

(d) one or more of the first pressure ring or the second pressure ring comprises one or more of fabric, composite, nitrile rubber (HNBR), polytetrafluoroethylene (PTFE), thermoplastic polyurethane (TPU), or polyurethane, or (e) the packing assembly further includes a junk ring, the junk ring comprising one or more of composite, steel, brass, bronze, aluminum, or polyether ether ketone (PEEK).

4. The fluid end of claim 1, wherein the packing assembly further comprises:

(a) a lube seal, (b) an adaptor ring, and (c) a junk ring.

5. The fluid end of claim 4, wherein one or more of:

(a) one or more of the header ring or the second pressure ring is positioned between the junk ring and the first pressure ring, (b) the adaptor ring is positioned between the first pressure ring and the lantern ring, or (c) one of: (1) the lube seal is received in a groove of the adaptor ring, or (2) the packing assembly further comprises a packing retainer nut and the lube seal is received in a groove in the packing retainer nut.

6. The fluid end of claim 1, wherein:

the inward facing surface of the first portion is substantially convex and at least partially defines a curved surface, and the inward facing surface of the second portion projects inward relative to the curved surface of the inward facing surface of the first portion.

7. The fluid end of claim 1, wherein one or more of:

(a) the second coefficient of friction ranges from 0.01 to 0.1, (b) the first material comprises one or more of a woven metal mesh, a non-woven metal mesh, a metal woven fabric, a metal non-woven fabric, a plurality of layers of metal mesh, a plurality of layers of metal mesh compressed into the seal body, a non-woven non-metal mesh, a woven non-metal mesh, a woven non-metal fabric, a non-woven non-metal fabric, polymers, thermoplastic polymers, thermosetting polymers, elastomeric polymers, elastomers, thermoplastics, thermosetting plastics, natural rubber, synthetic rubber, nitrile, butadiene rubber, polyether ether ketone (PEEK), fabric reinforced rubber, aramid reinforced rubber, fiber reinforced rubber, fluorocarbon resins, thermoplastic polyurethane (TPU), thermoplastic copolyester (COPE), ethylene propylene diene monomer (EPDM), highly saturated nitrile rubber (HNBR), thermoplastic polyurethane (TPU), or polyurethane, or (c) the second material comprises one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, or carbon nanotube-filled UHMW-PE.

8. The fluid end of claim 1, wherein:

(a) the second axial end surface of the third portion is substantially concave and extends between an inward facing surface of the third portion and an outward facing surface of the third portion, (b) the axial recess is positioned between the inward facing surface of the third portion and the outward facing surface of the third portion, and (c) the fourth portion includes:

(i) a fourth portion protrusion at least partially received in the axial recess of the third portion, (ii) an inward extending arm connected to the fourth portion protrusion, the inward extending arm positioned to bias the inward facing surface of the third portion radially inward, and (iii) an outward extending arm connected to the fourth portion protrusion, the outward extending arm positioned to bias the outward facing surface of the third portion radially outward, wherein:

the second axial end surface of the third portion comprises an inner ramp surface extending between the axial recess of the third portion and the inward facing surface of the third portion, the inner ramp surface lying at an inner ramp angle relative to a radial axis of the first pressure ring, the inward extending arm at least partially defines an inner arm angle relative to the radial axis of the first pressure ring, and the inner arm angle is less than or equal to the inner ramp angle.

9. The fluid end of claim 1, wherein:

the third portion includes a third material having the third coefficient of friction, and the fourth portion includes a fourth material having the fourth coefficient of friction, thereby to reduce friction at a second seal interface between the first pressure ring and the plunger, so as to reduce heat generation and extend a service life of the first pressure ring as the plunger moves relative to the fluid end block.

10. A packing assembly to enhance a seal between a surface of a first component of a fluid end and a surface of a second component of the fluid end, the packing assembly comprising:

(a) a header ring comprising a first seal body having a first seal body surface and a first seal cross-section at least partially defined by the first seal body surface, the first seal body having:

(i) a first portion including a first material, the first material having a first coefficient of friction ranging from 0.11 to 0.9, and (ii) a second portion including a second material, the second material having a second coefficient of friction less than the first coefficient of friction, thereby to reduce friction at a seal interface between the header ring and the second component, so as to reduce heat generation and extend a service life of the header ring as the second component moves relative to the first component, the first component comprising a stationary component relative to the second component during operation of the fluid end, and the second component comprising one of a reciprocating component or a rotating component relative to the first component during operation of the fluid end, the first portion including an inward facing surface, the first portion at least partially defining a recess in the inward facing surface, the second portion at least partially received in the recess in the inward facing surface of the first portion, the second portion including an inward facing surface, the inward facing surface of the second portion projecting inward relative to the inward facing surface of the first portion, and the inward facing surface of the second portion positioned at the seal interface between the packing assembly seal and the plunger;

(b) a first pressure ring including a second seal body having a second seal body surface and a second seal cross-section at least partially defined by the second seal body surface, the second seal body comprising:

(i) a third portion including a first axial end surface, a second axial end surface substantially opposite the first axial end surface, an inward facing surface, and an outward facing surface, the second axial end surface at least partially defining an axial recess, the third portion having a third coefficient of friction ranging from 0.11 to 0.9, and (ii) a fourth portion having a fourth coefficient of friction less than the third coefficient of friction, the fourth portion including:

(1) a fourth portion protrusion at least partially received in the axial recess of the third portion, (2) an inward extending arm connected to the fourth portion protrusion, the inward extending arm positioned to bias the inward facing surface of the third portion of the second seal body radially inward, and (3) an outward extending arm connected to the fourth portion protrusion, the outward extending arm positioned to bias the outward facing surface of the third portion of the second seal body radially outward;

(c) a second pressure ring between the header ring and the first pressure ring; and (d) a lantern ring.

11. The packing assembly of claim 10, wherein one or more of:

(a) the lantern ring comprises one or more of bronze, aluminum, or brass, (b) the packing assembly further includes a lube seal, the lube seal comprising one or more of an O-ring seal, natural rubber, synthetic rubber, polymeric material, nitriles, fluorocarbon resins, or silicone resins, (c) the packing assembly further includes an adaptor ring, the adaptor ring comprising one or more of bronze, aluminum, or brass, (d) one or more of the first pressure ring or the second pressure ring comprises one or more of fabric, composite, nitrile rubber (HNBR), polytetrafluoroethylene (PTFE), thermoplastic polyurethane (TPU), or polyurethane, or (e) the packing assembly further includes a junk ring, the junk ring comprising one or more of composite, steel, brass, bronze, aluminum, or polyether ether ketone (PEEK).

12. The packing assembly of claim 10, wherein the packing assembly further comprises:

(a) a lube seal, (b) an adaptor ring, and (c) a junk ring, wherein one or more of:

(i) one or more of the header ring or the second pressure ring is positioned between the junk ring and first pressure ring, (ii) the adaptor ring is positioned between the first pressure ring and the lantern ring, or (iii) one of: (1) the lube seal is received in a groove of the lantern ring, or (2) the packing assembly further comprises a packing retainer nut and the lube seal is received in a groove in the packing retainer nut.

13. The packing assembly of claim 10, wherein:

the inward facing surface of the first portion is substantially convex and at least partially defines a curved surface, and the inward facing surface of the second portion projects inward relative to the curved surface of the inward facing surface of the first portion.

14. The packing assembly of claim 10, wherein one or more of:

(a) the second coefficient of friction ranges from 0.01 to 0.1, (b) the first material comprises one or more of a woven metal mesh, a non-woven metal mesh, a metal woven fabric, a metal non-woven fabric, a plurality of layers of metal mesh, a plurality of layers of metal mesh compressed into the seal body, a non-woven non-metal mesh, a woven non-metal mesh, a woven non-metal fabric, a non-woven non-metal fabric, polymers, thermoplastic polymers, thermosetting polymers, elastomeric polymers, elastomers, thermoplastics, thermosetting plastics, natural rubber, synthetic rubber, nitrile, butadiene rubber, polyether ether ketone (PEEK), fabric reinforced rubber, aramid reinforced rubber, fiber reinforced rubber, fluorocarbon resins, thermoplastic polyurethane (TPU), thermoplastic copolyester (COPE), ethylene propylene diene monomer (EPDM), highly saturated nitrile rubber (HNBR), thermoplastic polyurethane (TPU), or polyurethane, or (c) the second material comprises one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, or carbon nanotube-filled UHMW-PE.

15. The packing assembly of claim 10, wherein:

(a) the fourth portion is at least partially received in the axial recess in the second axial end surface of the third portion, (b) the second axial end surface of the third portion extends between an inward facing surface of the third portion and an outward facing surface of the third portion, and (c) the fourth portion includes:

(i) a fourth portion protrusion at least partially received in the axial recess of the third portion, (ii) an inward extending arm connected to the fourth portion protrusion, the inward extending arm positioned to bias the inward facing surface of the third portion radially inward, and (iii) an outward extending arm connected to the fourth portion protrusion, the outward extending arm positioned to bias the outward facing surface of the third portion radially outward.

16. The packing assembly of claim 10, wherein:

the third portion includes a third material having the third coefficient of friction, and the fourth portion includes a fourth material having the fourth coefficient of friction, thereby to reduce friction at a second seal interface between the first pressure ring and the second component, so as to reduce heat generation and extend a service life of the first pressure ring as the second component moves relative to the first component.

17. A packing assembly to enhance a seal between a surface of a first component of a fluid end and a surface of a second component of the fluid end, the packing assembly comprising:

(a) a first seal ring comprising a first seal body having a first seal body surface and a first seal cross-section at least partially defined by the first seal body surface, the first seal body having:

(i) a first portion including a first material, the first material having a first coefficient of friction ranging from 0.11 to 0.9, and (ii) a second portion including a second material, the second material having a second coefficient of friction less than the first coefficient of friction, thereby to reduce friction at a seal interface between the first seal ring and the second component, so as to reduce heat generation and extend a service life of the first seal ring as the second component moves relative to the first component, the first component comprising a stationary component relative to the second component during operation of the fluid end, and the second component comprising one of a reciprocating component or a rotating component relative to the first component during operation of the fluid end, the first portion including an inward facing surface, the first portion at least partially defining a recess in the inward facing surface, the second portion at least partially received in the recess in the inward facing surface of the first portion, the second portion including an inward facing surface, the inward facing surface of the second portion projecting inward relative to the inward facing surface of the first portion, and the inward facing surface of the second portion positioned at the seal interface between the packing assembly seal and the second component;

(b) a second seal ring including a second seal body having a second seal body surface and a second seal cross-section at least partially defined by the second seal body surface, the second seal body comprising:

(i) a third portion including a first axial end surface, a second axial end surface substantially opposite the first axial end surface, an inward facing surface, and an outward facing surface, the second axial end surface at least partially defining an axial recess, the third portion having a third coefficient of friction ranging from 0.11 to 0.9, and (ii) a fourth portion having a fourth coefficient of friction less than the third coefficient of friction, the fourth portion including:

(1) a fourth portion protrusion at least partially received in the axial recess of the third portion, (2) an inward extending arm connected to the fourth portion protrusion, the inward extending arm positioned to bias the inward facing surface of the third portion of the second seal body radially inward, and (3) an outward extending arm connected to the fourth portion protrusion, the outward extending arm positioned to bias the outward facing surface of the third portion of the second seal body radially outward;

(c) a third seal ring between the first seal ring and the second seal ring; and (d) a packing assembly ring.

18. The packing assembly of claim 17, wherein the first seal ring comprises a header ring.

19. The packing assembly of claim 17, wherein:

the inward facing surface of the first portion is substantially convex and at least partially defines a curved surface, the second portion includes an inward facing surface, the inward facing surface of the second portion projecting inward relative to the curved surface of the inward facing surface of the first portion, and the second portion includes an inward facing surface, the inward facing surface of the second portion positioned at the seal interface between the first seal ring and the second component.

20. The packing assembly of claim 17, wherein one or more of:

(a) the second coefficient of friction ranges from 0.01 to 0.1, (b) the first material comprises one or more of a woven metal mesh, a non-woven metal mesh, a metal woven fabric, a metal non-woven fabric, a plurality of layers of metal mesh, a plurality of layers of metal mesh compressed into the seal body, a non-woven non-metal mesh, a woven non-metal mesh, a woven non-metal fabric, a non-woven non-metal fabric, polymers, thermoplastic polymers, thermosetting polymers, elastomeric polymers, elastomers, thermoplastics, thermosetting plastics, natural rubber, synthetic rubber, nitrile, butadiene rubber, polyether ether ketone (PEEK), fabric reinforced rubber, aramid reinforced rubber, fiber reinforced rubber, fluorocarbon resins, thermoplastic polyurethane (TPU), thermoplastic copolyester (COPE), ethylene propylene diene monomer (EPDM), highly saturated nitrile rubber (HNBR), thermoplastic polyurethane (TPU), or polyurethane, or (c) the second material comprises one or more of polytetrafluoroethylene (PTFE), virgin PTFE, glass-filled PTFE, graphite-filled PTFE, bronze-filled PTFE, moly disulfide-filled PTFE, graphene-filled PTFE, ultra-high-molecular-weight polyethylene (UHMW), UHMW-polyethylene (PE), graphene-filled UHMW, graphene-filled UHMW-PE, carbon nano-tube-filled PTFE, carbon nanotube-filled UHMW, or carbon nanotube-filled UHMW-PE.

21. The packing assembly of claim 17, wherein:

(a) the second seal ring comprises a pressure ring, (b) the second axial end surface of the third portion is substantially concave and extends between an inward facing surface of the third portion and an outward facing surface of the third portion, (c) the axial recess is positioned between the inward facing surface of the third portion and the outward facing surface of the third portion, and (d) the fourth portion includes:

(i) a fourth portion protrusion at least partially received in the axial recess of the third portion, (ii) an inward extending arm connected to the fourth portion protrusion, the inward extending arm positioned to bias the inward facing surface of the third portion radially inward, and (iii) an outward extending arm connected to the fourth portion protrusion, the outward extending arm positioned to bias the outward facing surface of the third portion radially outward.

22. The packing assembly of claim 17, wherein the third portion includes a third material having the third coefficient of friction, and the fourth portion includes a fourth material having the fourth coefficient of friction, thereby to reduce friction at a second seal interface between the second seal ring and the second component, so as to reduce heat generation and extend a service life of the second seal ring as the second component moves relative to the first component.

23. The packing assembly seal of claim 22, wherein:

the first seal ring comprises a header ring, the second seal ring comprises a first pressure ring, and the third seal ring comprises a second pressure ring between the header ring and the first pressure ring.

24. A method for enhancing a seal between a surface of a first component of a fluid end and a surface of a second component of the fluid end, the method comprising:

(a) positioning a first seal ring between the surface of the first component and the surface of the second component, the first seal ring having a first seal body having a first seal body surface and a first seal cross-section at least partially defined by the first seal body surface, the first seal body having:

(i) a first portion including a first material, the first material having a first coefficient of friction ranging from 0.11 to 0.9, and (ii) a second portion including a second material, the second material having a second coefficient of friction less than the first coefficient of friction, thereby to reduce friction at a seal interface between the first seal ring and the second component, the first portion including an inward facing surface, the first portion at least partially defining a recess in the inward facing surface, the second portion at least partially received in the recess in the inward facing surface of the first portion, the second portion including an inward facing surface, the inward facing surface of the second portion projecting inward relative to the inward facing surface of the first portion, and the inward facing surface of the second portion positioned at the seal interface between the packing assembly seal and the second component;

(b) suppressing generation of heat associated with the first seal ring between the first component and the second component, via the second portion of the first seal ring, during operation of the fluid end as the second component moves relative to the first component;

(c) positioning a second seal ring between the surface of the first component and the surface of the second component, the second seal ring including a second seal body having a second seal body surface and a second seal cross-section at least partially defined by the second seal body surface, the second seal body comprising:

(i) a third portion including a first axial end surface, a second axial end surface substantially opposite the first axial end surface, an inward facing surface, and an outward facing surface, the second axial end surface at least partially defining an axial recess, the third portion having a third coefficient of friction ranging from 0.11 to 0.9, and (ii) a fourth portion having a fourth coefficient of friction less than the third coefficient of friction, the fourth portion including:

(1) a fourth portion protrusion at least partially received in the axial recess of the third portion, (2) an inward extending arm connected to the fourth portion protrusion, the inward extending arm positioned to bias the inward facing surface of the third portion of the second seal body radially inward, and (3) an outward extending arm connected to the fourth portion protrusion, the outward extending arm positioned to bias the outward facing surface of the third portion of the second seal body radially outward, (d) positioning a third seal ring between the first seal ring and the second seal ring, and (e) positioning a packing assembly ring between the surface of the first component and the surface of the second component.

25. The method of claim 24, wherein the positioning of the first seal ring between the surface of the first component and the surface of the second component comprises positioning the first seal ring between a stationary component of the fluid end and one of (a) a reciprocating component of the fluid end or (b) a rotating component of the fluid end.

26. The method of claim 24, further comprising transferring, via operation of the fluid end, a portion of the second material onto the second component, the transferring of the portion of the second material onto the second component comprising lubricating the seal interface.

* * * * *